(12) United States Patent
Koskinen

(10) Patent No.: US 6,527,556 B1
(45) Date of Patent: Mar. 4, 2003

(54) METHOD AND SYSTEM FOR CREATING AN INTEGRATED LEARNING ENVIRONMENT WITH A PATTERN-GENERATOR AND COURSE-OUTLINING TOOL FOR CONTENT AUTHORING, AN INTERACTIVE LEARNING TOOL, AND RELATED ADMINISTRATIVE TOOLS

(75) Inventor: Robin S. Koskinen, Chicago, IL (US)

(73) Assignee: Intellishare, LLC, Chicago, IL (US)

( * ) Notice: Subject to any disclaimer, the term of this patent is extended or adjusted under 35 U.S.C. 154(b) by 0 days.

(21) Appl. No.: 09/570,627

(22) Filed: May 15, 2000

Related U.S. Application Data

(63) Continuation-in-part of application No. 08/968,931, filed on Nov. 12, 1997, now Pat. No. 6,062,862.

(51) Int. Cl.[7] .............................. G09B 19/00; G09B 7/00
(52) U.S. Cl. ..................... 434/219; 434/322; 434/323; 434/362
(58) Field of Search ................................ 434/118, 156, 434/157, 167, 178, 179, 219, 308, 322, 323, 335, 362

(56) References Cited

U.S. PATENT DOCUMENTS

| | | | |
|---|---|---|---|
| 4,595,982 A | | 6/1986 | Burt |
| 4,648,037 A | | 3/1987 | Valentino |
| 4,772,206 A | | 9/1988 | Kerr et al. |
| 4,847,784 A | | 7/1989 | Clancey |
| 5,006,987 A | * | 4/1991 | Harless ...................... 434/323 |
| 5,103,498 A | | 4/1992 | Lanier et al. |
| 5,147,205 A | * | 9/1992 | Gross et al. ................. 434/169 |
| 5,306,154 A | | 4/1994 | Ujita et al. |
| 5,339,392 A | | 8/1994 | Risberg et al. |
| 5,372,507 A | | 12/1994 | Goleh |
| 5,395,243 A | | 3/1995 | Lubin et al. |
| 5,421,730 A | | 6/1995 | Lasker, III et al. |
| 5,441,415 A | | 8/1995 | Lee et al. |
| 5,442,759 A | | 8/1995 | Chiang et al. |
| 5,454,104 A | | 9/1995 | Steidlmayer et al. |
| 5,489,213 A | | 2/1996 | Makipaa |
| 5,502,637 A | | 3/1996 | Beaulieu et al. |
| 5,535,422 A | | 7/1996 | Chiang et al. |
| 5,540,589 A | | 7/1996 | Waters |
| 5,597,312 A | | 1/1997 | Bloom et al. |
| 5,692,233 A | | 11/1997 | Garman |
| 5,727,950 A | * | 3/1998 | Cook et al. .................. 434/350 |
| 6,014,134 A | | 1/2000 | Bell et al. |
| 6,336,813 B1 | * | 1/2002 | Siefert ........................ 434/322 |

* cited by examiner

*Primary Examiner*—John Edmund Rovnak
(74) *Attorney, Agent, or Firm*—Michael Best & Friedrich, LLP

(57) ABSTRACT

A method of and system of creating, delivering, and administering training materials, The system permits rapid development of large amounts of interactive content without requiring authoring experts. The content is deliverable via a client-server or Application Service Provider environment, such as the Internet. Content teaches skills necessary to perform a job. The system provides administrative management of the lerning process.

In one embodiment, the invention teaches a set of skills by exposing candidates to enough realistic examples for them to begin recognizing the patterns involved, and by allowing them to participate in simulations of the environment. Embodiments of the invention employ a conversational technique for teaching particular skills, simulating an apprentice-mentor relationship. Some embodiments allow for evaluating the learner's proficiency or understanding of the content. Some embodiments permit administrators to monitor performance as a function of training received, and to incorporate resources provided by other entities into the measurement.

36 Claims, 36 Drawing Sheets

FIG. 18

Create New Course Screen

450

Create New Course Screen

Name of Course:

Course Objective:

Mentor's Introduction File #:

Notes:

Other Introduction File #:

Click here to create a file for this New Course

Click here to add a Major Learning Area to this New Course

Indicates field to be filled in by user.

FIG. 19

Add / Edit / Delete a Major Learning Area

470

Add / Edit a Major Learning Area Screen

Name of Course:

Major Learning Area:                Learning Area Location:

Major Learning
Area Objective:

Mentor's Introduction            Other Introduction
File #:                                    File #:

Course Objective:

Accept this Major Learning Area

Delete this Major Learning Area

Add Another Major Learning Area

Add a Sub-Area to this Major Learning Area

Indicates field to be filled in by user.

FIG. 20

Add / Edit / Delete a Sub-Area

520

Add / Edit / Delete a Sub-Area Screen

Name of Course:

Major Learning Area: | Learning Area Location:

Sub-Area: | Sub-Area Location:

Sub-Area Objective:

Mentor's Introduction File #: | Other Introduction File #:

Notes:

Add a Knowledge Cell to this Sub-Area — 540

Edit a Knowledge Cell in this Sub-Area

Accept this Sub-Area

Delete this Sub-Area ← 542

Add Another Sub-Area

Indicates field to be filled in by user.

Knowledge Cell Screen

Indicates field to be filled in by user.

Scenario Screen

820 →  Scenario Sentence / Distracter / Hint Screen

Speaker:  
Sentence Function:  
Speaker's Role:  
Speaker's Attitude:

Scenario Restrictions:

Customer: Dave  
Amount: $5,000,000  
Security: 10-years  
Price: Par 17

Sentence, Distracter or Hint:

Model Sentence:

Existing Sentences:

Number of Existing Sentences:

Next Activity Box of this Conversation Module:  
Previous Activity Box of this Conversation Module:  
Create a new Scenario for this Conversation Module:  
Accept this Scenario:  
Delete this Scenario:

FIG. 23

METHOD AND SYSTEM FOR CREATING AN INTEGRATED LEARNING ENVIRONMENT WITH A PATTERN-GENERATOR AND COURSE-OUTLINING TOOL FOR CONTENT AUTHORING, AN INTERACTIVE LEARNING TOOL, AND RELATED ADMINISTRATIVE TOOLS

RELATED APPLICATIONS

The present application is a continuation-in-part of U.S. application Ser. No. 08/968,931, filed Nov. 12, 1997, Pat. No. 6,062,862.

BACKGROUND OF THE INVENTION

The present invention relates to systems and methods used to train individuals for particular labor positions and for personal growth. More particularly, the invention relates to a method and system for implementing an integrated learning environment containing authoring, interactive learning, and administrative functions that may be implemented in a client-server or Application Service Provider ("ASP") environment, such as the Internet.

Many employment positions, ranging from a bank teller to a financial advisor, require a specific, identifiable set of job skills. Often, these skills are learned through a combination of training classes and On-the-Job Training ("OJT"). While training programs with classroom and practical components do impart a certain set of skills to employees, the programs are less than ideal. Training classes are expensive to provide. The direct costs associated with classroom instruction include the cost of providing classroom space, providing an instructor, providing educational materials (such as books, software, audio/visual materials, and the like), and providing classroom equipment (such as computers). One of the biggest problems is that classroom training usually involves describing the task, not actually doing it. It is only through performing a task repeatedly that a learner can come to recognize the patterns that differentiate one situation from another. This is what the traditional master-apprentice relationship tries to impart.

Real-life OJT is not an efficient way to learn job skills. In many instances, OJT results in an employee conducting many of the same routine tasks multiple times, while not having the opportunity to perform or learn how to perform less common tasks, which are nevertheless within the job description of the employee. For example, a bank teller may spend 60 to 80 percent of his or her time processing deposits. The repetition associated with processing deposits usually results in the teller gaining excellent proficiency for this particular task. However, tasks encountered less often, such as opening a reserve line of credit for a checking account, are not learned as well. A deficiency with both classroom and OJT is that mistakes made in either environment can embarrass the student-candidate or leave him or her feeling inadequate for the position. Yet, the learning process inherently includes making mistakes.

Existing Computer Based Training ("CBT") systems address some of these issues. Once a course has been developed, it is much cheaper to deliver than conducting live classrooms. It can be delivered at the convenience of the learner, rather than the trainer. Learning can be self-paced according to the learner's abilities. Any mistakes are committed in private.

In spite of these advances, problems remain. Perhaps the biggest problem is that effective content is very expensive to produce. It requires a substantial commitment of time and effort from practitioners, or Subject Matter Experts ("SME's"). Authoring experts must turn the vision of the SME's into a course, a process that frequently results in an end-product that is one step removed from the immediacy of the practitioner's knowledge. Alpha and Beta testing take time, and subsequent revisions again require authoring experts. The inevitable consequence is that most training simulations are limited to one-size-fits-all solutions. Once the learner has gone through the tutorial, that's it; they get very little additional benefit from doing it again. It doesn't approach the richness of the possible variations that are encountered in the real work environment.

A related problem is the issue of training administration. Once a course has been developed, how does one track who has been through it, or how have they done? Does a change in the order of course modules make a difference in end results? Are there synergies among courses and training materials offered by different providers? Maybe the most important question is what impact does the training have on actual job performance?

As changes in the working environment become more and more an inescapable fact of life, these issues will only intensify.

SUMMARY OF THE INVENTION

Accordingly, there is a need for improved and more integrated methods and systems of creating, delivering, and administering effective training materials for job candidates. There is a particular need to provide a cost-effective system that permits rapid development of large amounts of highly interactive content, ideally without relying on the need for authoring experts. Preferably, the content is deliverable via a client-server or Application Service Provider ("ASP") environment, such as the Internet, so that it can be accessed anywhere, anytime, teaches a student all skills necessary to perform a job, and allows for administrative management of the entire learning process.

The present invention provides an interactive computer based method and system for creating large amounts of highly interactive, realistic training content using a pattern-capturing tool, and a directed navigation guide tool. The invention teaches job candidates a set of skills by exposing them to sufficient examples of work situations for them to start to recognize the patterns involved in the task, and, when they are ready, by allowing them to participate in a realistic simulation of the actual work environment. The invention employs a conversational technique to teaching particular skills, simulating, in virtual reality, a real-world apprentice-mentor relationship. The invention further allows for evaluating the candidates' proficiency or understanding of the subject matter. It is another attribute of the invention that it allows the training administrator to monitor learner performance as a function of training received, and to incorporate resources provided by other firms into the measurement. All of the functionality of the present invention is accessible through any standard browser interface.

As is apparent from the above, it is an advantage of the present invention to provide a method and system for the creation, maintenance, delivery and administration of an integrated computer-based, preferably client-server based, learning environment. Other features and advantages of the present invention will become apparent by consideration of the detailed description and accompanying drawings.

BRIEF DESCRIPTION OF THE DRAWINGS

In the drawings:

FIG. 18 is a depiction of a new course screen of the invention.

FIG. 19 is a depiction of an add/edit/delete learning screen of the invention.

FIG. 20 is a depiction of an add/edit/delete sub-area screen of the invention.

FIG. 23 is a depiction of a scenario screen of the invention.

DETAILED DESCRIPTION

Figure 1:
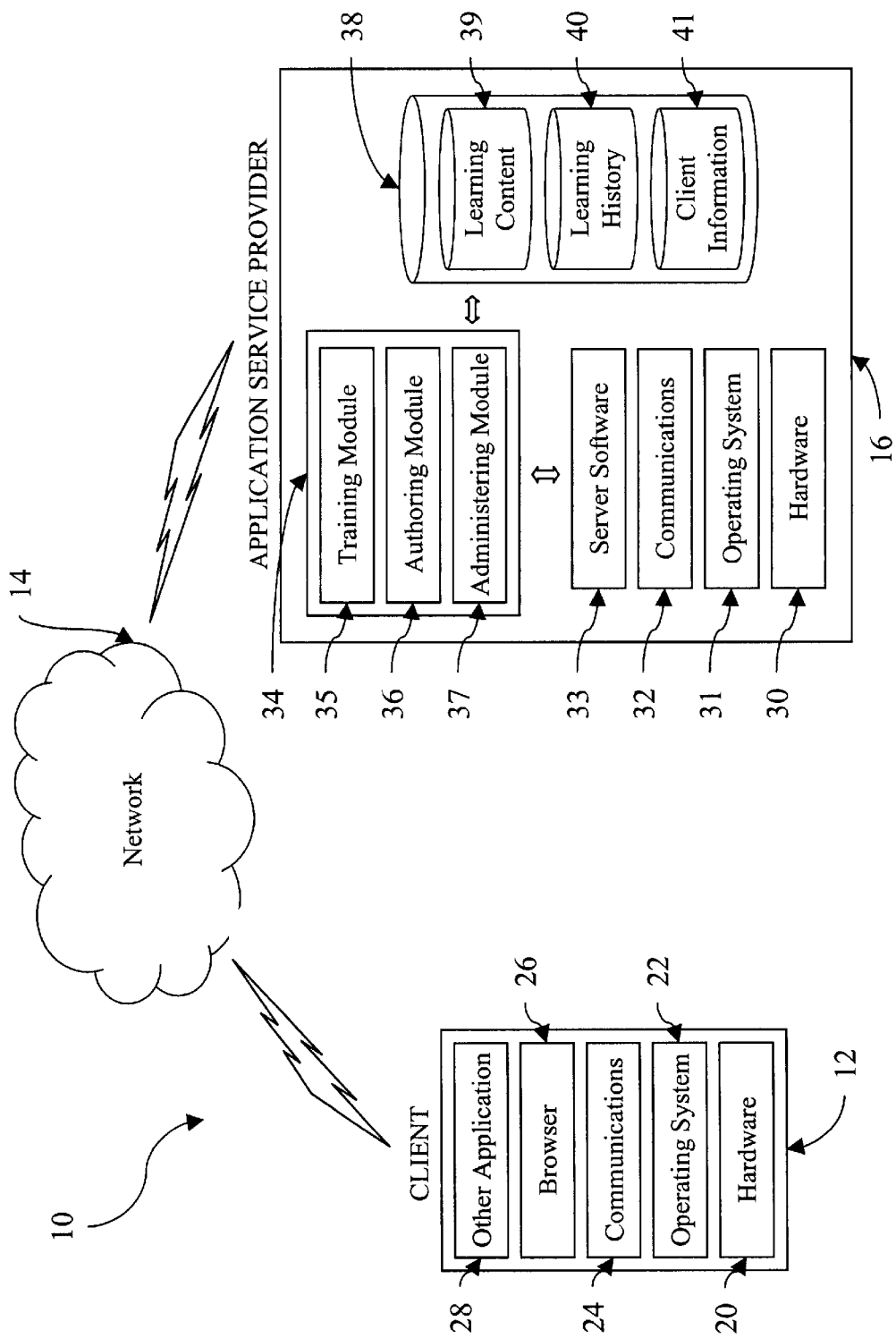
FIG. 1 is a schematic diagram of an exemplary job training system of the invention.

Before one embodiment of the invention is explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

FIG. 1 illustrates a system 10 for creating, maintaining, delivering and administering a learning environment. In a preferred embodiment of the invention the learning environment may be delivered by an application service provider (ASP). The learning environment system 10 includes a client 12, a network 14, and a server 16, which may be operated by an ASP. The client 12 may be a personal computer, Internet appliance, or other device that is capable of communicating with a server over a network, including a dumb terminal. A typical client 12 includes a hardware layer 20, an operating system 22, a communication module 24, and a browser 26. The client 12 may include other application programs 28.

The server 16 includes a hardware layer 30, an operating system 31, a communication module 32, and a server software module 33. The server includes several application modules 34, namely a training module 35, an authoring module 36, and an administering module 37. Databases 38 include a knowledge base or interactive learning content 39, learning history 40, and client information 41. The client 12 communicates with the server 16 over the network 14 using standard communication protocols and techniques, such as TCP/IP. The server software module 33 responds to requests from the client 12 and retrieves web pages, and other information (not shown) from the applications modules 34 and the databases 38.

Much of the system 10 is built using commercially available hardware and software. Accordingly, specific details regarding commonly available components are not provided. Rather, the focus of this description is on the learning content 39, the learning history 40, the client information 41 and certain aspects of the applications modules 34. The applications modules 38 are designed to present graphical user interfaces in the form of web pages to the client 12. Those of ordinary skill in the art could readily develop the web pages and related software needed to create a training module based on the functional description of the system provided below. Likewise, a person of ordinary skill in the art could create learning content as well as administrative and authoring environments based on the description provided herein.

There are many types of interactions, both professional and personal, that involve some sort of a back and forth dialogue (which may be oral or otherwise) between two or more people or between a person and a device. Example dialogues include dialogues that occur when using a software program or when diagnosing a mechanical problem. There can be numerous branches in any of these interactions, where the direction of the flow is determined by the responses to situations, or the information discovered along the way. Traditional training methods discuss the logic that a person might use to make the appropriate choices as he or she progresses down these various paths. This is a valuable process, but it is only by doing it oneself, sometimes again and again, that a person can really come to learn and understand the patterns that exist in these situations. Most people learn by doing, by making mistakes, by repetition. For many jobs, this is simply an inevitable part of the learning process.

Currently, training content is very expensive to produce. Traditional methods cannot economically create enough simulated variations of all of the possible paths that a dialogue might take. It does no good for a learner to repeat them over and over. For one thing, seeing the same content repeatedly would quickly bore the learners. For another, the limited scenarios that may have been produced will only help them if they encounter exactly the same situation on the job. Most traditional methods do not help learners understand variations, or the nuances of a specific situation.

Figure 2:
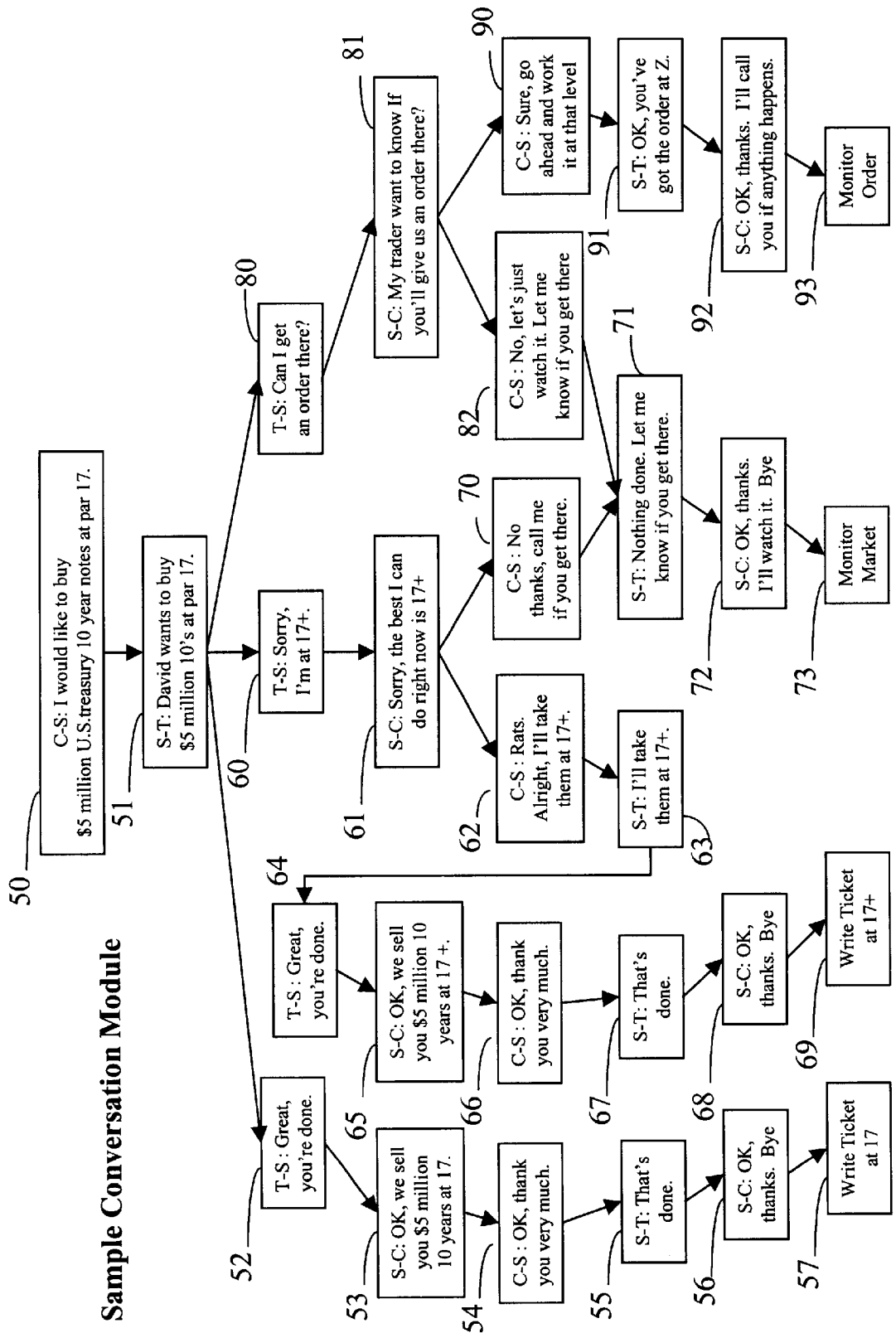
FIG. 2 is a schematic diagram of an exemplary conversation that may be captured with the system of the invention.

The present invention provides a method and system for the creation of large amounts of training simulations quickly and inexpensively. This large supply of simulations allows the learner to observe as many realistic interactions between knowledgeable practitioners as they desire or need. When they are ready, they can participate with the content in a highly interactive way. FIG. 2 is a graphic depiction of a representative set of possible conversations. This example involves a customer for a bond transaction, a bond salesperson, and a bond trader, but as will become apparent to one skilled in the art, the concept applies to interactions in many other fields.

The conversation begins at step 50 with the customer saying to the salesperson (C-S) "I would like to buy $5 million U.S. Treasury 10 year notes at par 17." As shown at step 51, the salesperson relays the request to the trader (S-T) by saying "David (the customer's name) wants to buy $5 million 10 years at par 17." At this point, the trader may respond to the salesperson (T-S) in one of a number of ways, depending on their position and market outlook. They may say "Great, you're done" as shown at step 52 in which case the dialogue would continue logically down through steps 53, 54, 55, 56 and 57, culminating with the salesperson writing the trading ticket for $5 million 10 year notes at the price of par 17. As an alternative, the trader might offer the securities at a slightly higher price, say par 17 ½, (or 17+in the lingo of the business) as is shown at step 60. In this case, the salesperson conveys the response to the customer at step 61 and now the customer has a choice. They may accept the offer at step 62 in which case the salesperson confirms the trade to the trader at step 63 and then the conversation proceeds in steps 64 to 69. This section parallels the conversation from steps 52 to 57, with the exception that now the price in the conversation and on the ticket is par 17+. If the customer rejects the offer, as shown at step 70, the salesperson again relays the information to the trader at step 71 and the conversation winds up, proceeding through steps 72 and 73.

A third possibility, shown at step 80, is for the trader to ask for an order. (This would allow the trader to try to buy securities from another source and pass them through to the customer without risking the firm's capital.) Again, the salesperson relays the response to the customer step 81 and once more the customer has a choice. If they say "No, let's just watch it. Let me know if you get there," as shown as step 82, the dialogue proceeds exactly as it would after step 70. If the customer agrees to give an order, as shown at step 90, the salesperson relays the information to the trader at step 91 and then the dialogue proceed through steps 92 and 93.

Many conversations in a wide variety of situations take this same basic pattern. The interaction starts out in one place, with a question, an inquiry, a statement or some other input. There are usually only a small number of outcomes possible, given the context and the starting point. In the present example there are only two basic results: write a ticket (at one or the other of the two prices) or watch the market. In between the beginning and the end, however, there are lots of possibilities that may arise; there are numerous paths from the beginning of the conversation to the final result.

Some other examples of interactions of this type might include: a bank teller, an insurance salesperson, or a postal clerk talking with a customer; a call-center or help-desk operator answering a question over the telephone; a doctor having a diagnostic conversation with a patient, an air traffic controller talking with a pilot, a network expert troubleshooting a problem with a customer's systems infrastructure, or even a customer ordering lunch in a restaurant. In each case, the dialogue will move along, creating and choosing from among various branching opportunities, all within a finite space determined by the context of the situation.

In addition to there being many different paths, in real life there are many different ways to say each of the elements of this conversation. That is, there are alternative ways that a customer might say effectively the same thing. For example, the example above might be changed to:

Can you offer me $5 million 10-years at 101-17?

I'd pay 17 for $5 million 10-years.

I'm looking for 10-years. I'll pay 101-17 for 5.

Is your guy a seller of 10-years at 17? I'd pay that for 5.

I see 10-years offered at 17+on the screen. I'd pay 17 for 5 if you care.

That's my 17 bid on Cantor for a million 10-years. I'd pay it for 5 if you were interested.

Where would you offer 10-years. I'm looking for 5 at 17.

I'm looking for 10's. Can you sell me any at 17? Say a 5 lot?

I'm getting killed on my 10-years short here. Any chance of getting 5 at 101-17?

What's your guy doing in 10-years? I'm a buyer of 5 at 17.

It would clearly be advantageous for a trainer to be able to easily define patterns of such dialogues, and then to enter a number of different ways that each functional element might occur in real life. If a system could randomly choose from among the defined paths, and then display one of the sentences at a time, a learner could play back the interactions repeatedly, never knowing in advance which choices the other virtual participants will make, or how they will say them. If the author included some incorrect "distracter" sentences in the parts of the conversation that relate to the role the learner is studying, the learner could participate in the dialogue by choosing the correct response from a set of possibilities. This would allow practitioners in any field to create very realistic simulations of their day-to-day activities without needing to hire expensive authoring experts. They would only need to be able to type in sentences in the appropriate language.

Figure 3:
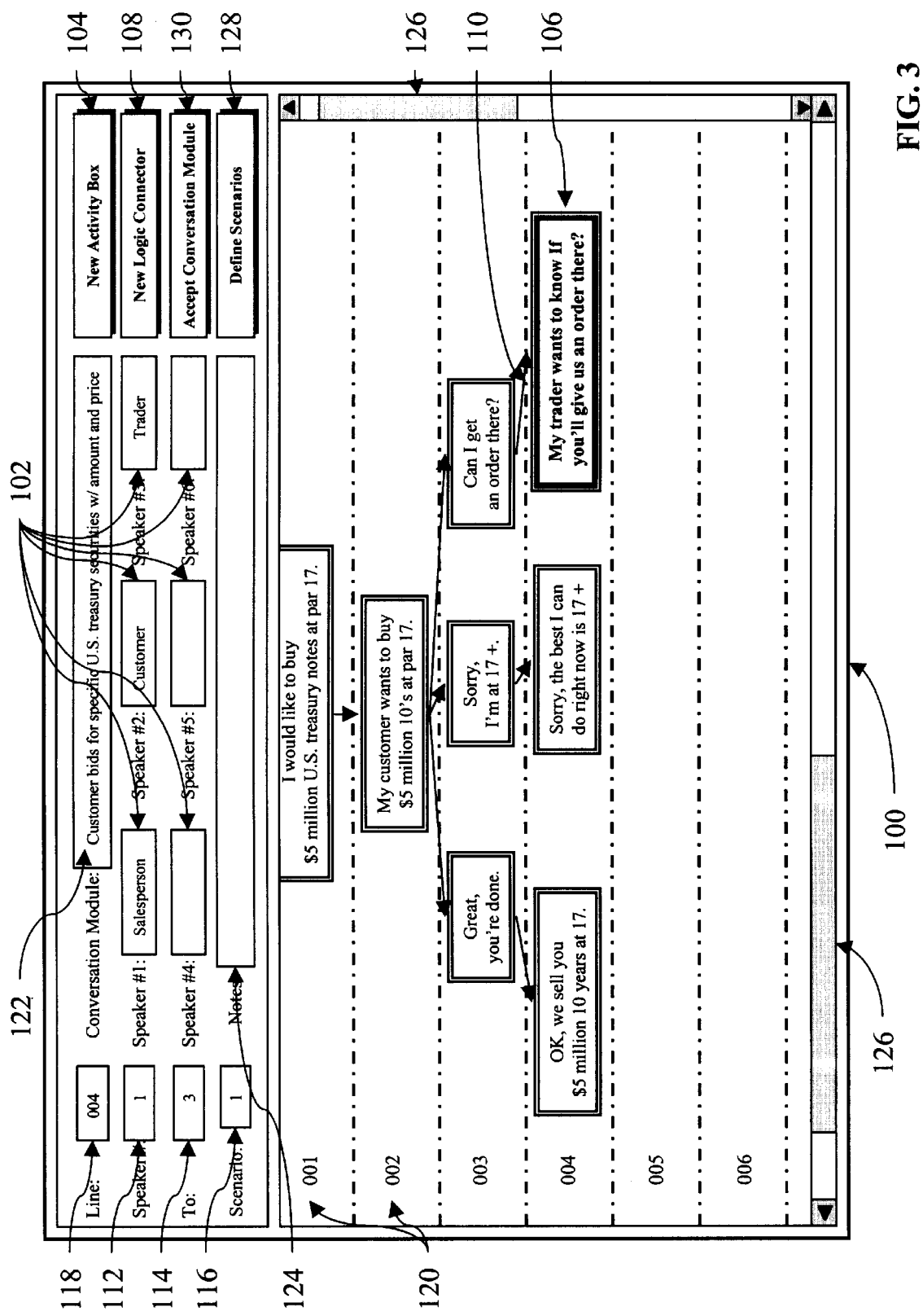
FIG. 3 is a schematic diagram of a user interface used to capture or create conversations.

The invention allows authors to capture dialogue patterns with a simple drag and drop user interface, shown in FIG. 3. This illustration shows a conversation module window 100 of the interface as it is being used to define the conversation described above. An author can begin by entering the functions of the participants or speakers in the appropriate speaker fields 102. Following the example above, this would require a customer, a salesperson, and a trader. Each speaker may be considered to be a virtual character for the dialogue or conversation. The initial list of speakers for a dialogue does not need to be complete, since additional roles or characters can be added later on if they become necessary.

Once the speakers are defined, the author clicks on the new activity box tab 104 to create a new activity box 106 on the screen. Once the activity box is positioned to a desired location, the author may select a tab 108 labeled new logic connector and create a connecting line 110 from the previous activity box to the newly created one. Then the author types in the desired sentence in the currently active box. This sentence becomes the model sentence for this activity box. The author can define which virtual player is supposed to be speaking the sentence, and who they are addressing, by making entries in the speaker field 112 and to field 114 that correspond with the functional roles defined in the speaker fields 102 defined above. The text in the active box 106, the text in a line field 118, and a line identification numbers 120 automatically assume the same color as the defined speaker fields 102. This helps the author in identifying the speaker for any line. The active box 106 is always highlighted on the interface so that it can be readily identified.

Other fields on the conversation module window include a conversation module name box 122, where the author can describe the contents of the dialogue.

A line field 118 shows the ordinal location of the active activity box 106 in the present dialogue. A notes field 124 provides the author with a place to make any relevant commentary regarding the dialogue. Horizontal and vertical scroll bars 126 allow the author to move around to view the entire conversation module. A define scenarios field 128 will be discussed below.

Figure 4:
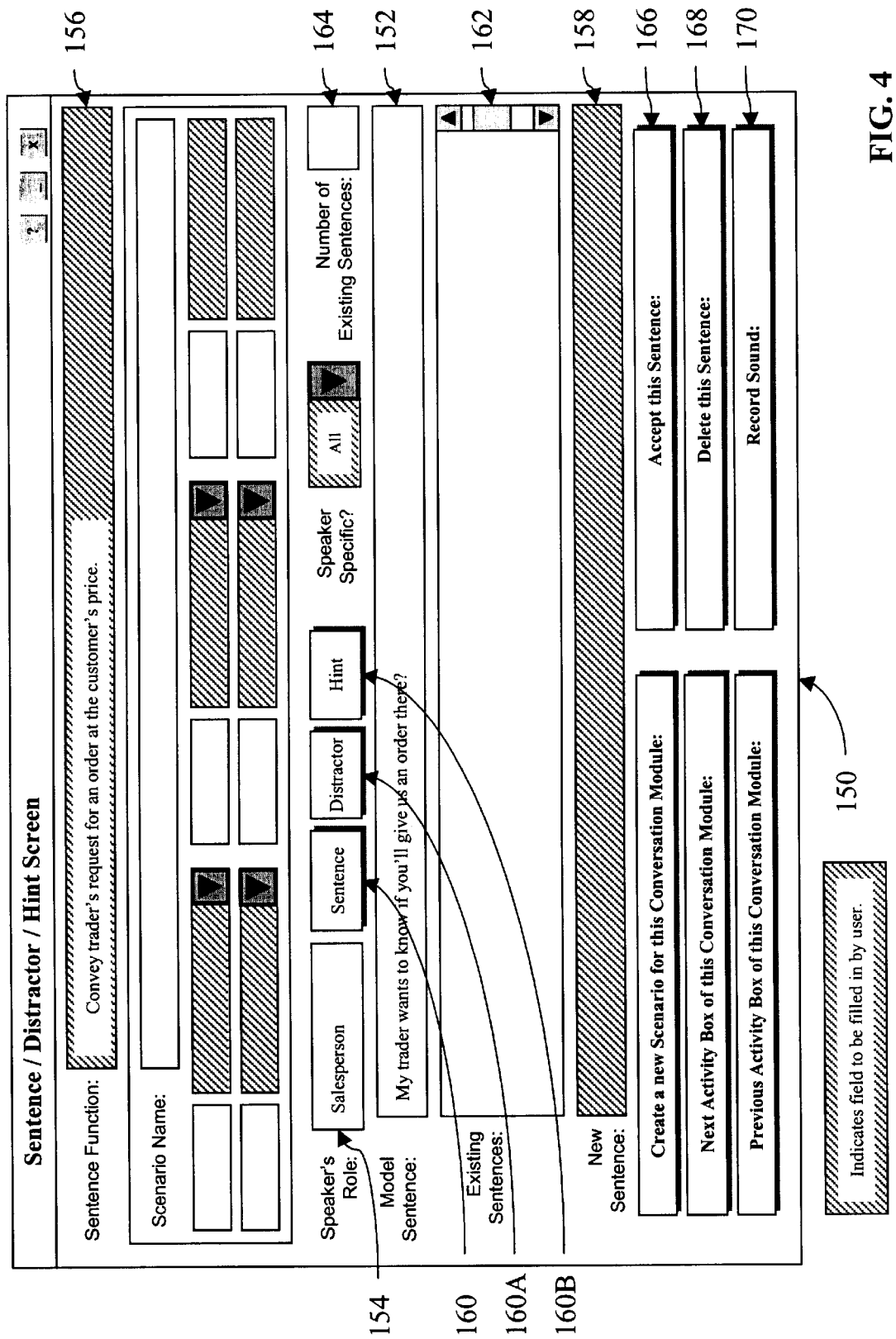
FIG. 4 is a schematic diagram of a sentence/distractor/hint screen of the invention.

When the author is satisfied with the setup, he or she can select the accept conversation module tab 130 and the module is immediately available for viewing online. In order to add additional sentences to each activity box, the author navigates to a sentence/distracter/hint screen 150 as shown in FIG. 4. For the purposes of this example, the model sentence that was entered in the activity box 106 on the conversation module window in FIG. 3 appears in the model sentence field 152. The speaker's role box 154 is also taken from the conversation module window in FIG. 3, where it is defined in field 102. At this point, the author can enter a description of the function of the current sentence in a sentence function field 156. The sentence function field provides information about the sentence that may be used by a second author. In this way, more than one person may be involved in creating additional sentences for the conversation module. The author can enter a new sentence in field 158. By using the control buttons 160, 160A, and 160B, the author can define the new sentence as being a sentence, a distracter, or a hint, respectively. Once there is more than one sentence entered for the activity box, all existing sentences can be reviewed in field 162, and any of these sentences can be edited by clicking on them. The total number of sentences for the activity box appears in field 164. The author can accept or delete any sentences by clicking on the appropriate tabs 166 or 168. If the author wishes to have recordings of the sentences so that learners can hear actual voices speaking, the author may select a record sound button 170. The remaining fields of the sentence/distracter/hint screen 150 are discussed below.

So far, the system features that provide an author the ability to capture a simple set of dialogue paths; and to add, edit, delete, and record sentences, distracters, and hints has been described. The next section describes the enhanced authoring capabilities of the invention. The invention allows the author to leverage content that has already been created. One way this is accomplished is through the use of multiple scenarios.

Following the example already discussed, suppose a customer named David wants to buy $5 million U.S. treasury 10-year notes at a price of par 17. All of the sentences created by the author relate to that specific scenario. They would all apply equally well, however, if they related to a customer named Susie, and she wanted to buy $20 million U.S. treasury 2-year notes at 99½. This would simply be a different scenario using the same conversation module. By adding an additional set of sentences created by simply substituting these new values into the existing sentences, the author could effectively double the content. A third set of values, for example, Pete wants to buy $8 million U.S. treasury 3-year notes at 99⅞, would triple the content.

Figure 5:
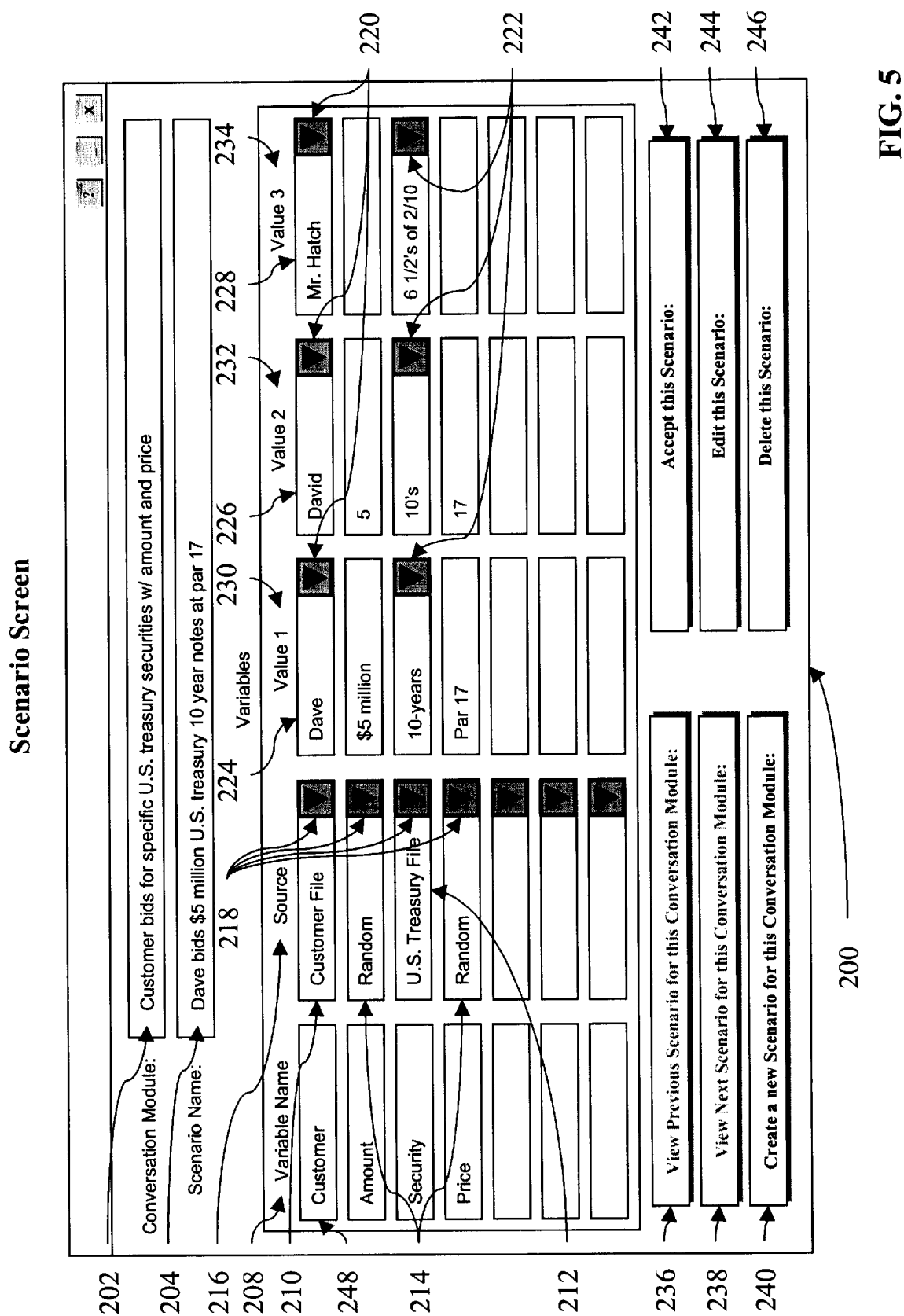
FIG. 5 is a schematic diagram of a scenario screen of the invention.

The invention allows the author to accomplish this automatically by using a scenario screen 200 in FIG. 5 and the sentence/distractor/hint screen 150 in FIG. 4. The scenario screen 200 is accessed by clicking on the define scenarios button 128 on the conversation module screen in FIG.3. When the scenario screen 200 first appears, a conversation module name 202 appears exactly as it was entered in field 122 of the conversation module screen FIG. 3. The scenario name field 204 allows the author to enter a plain text name to help in quickly identifying differences between scenarios. In this example, "Dave bids $5 million U.S. treasury 10-year notes at par 17" distinguishes the different scenarios.

Next, the author enters the names of the appropriate variables, in any order, into the boxes in a variable name column 208. In the example conversation module, the variables include the name of the customer, the amount of the transaction, the security that the customer wishes to purchase, and the price the customer wishes to pay. In the most basic form of the invention, the author now ignores information in a source column 216, and simply enters the values used for each of these variables in a value 1 variable 224 to the right of the its name. For example, the word "Dave" is entered in box 226 which is positioned two columns to the right of a box 248 having the customer's name. Additional variety can be created by adding other nicknames for the customer in value 2 and value 3 columns 232 and 234, respectively.

Figure 6:
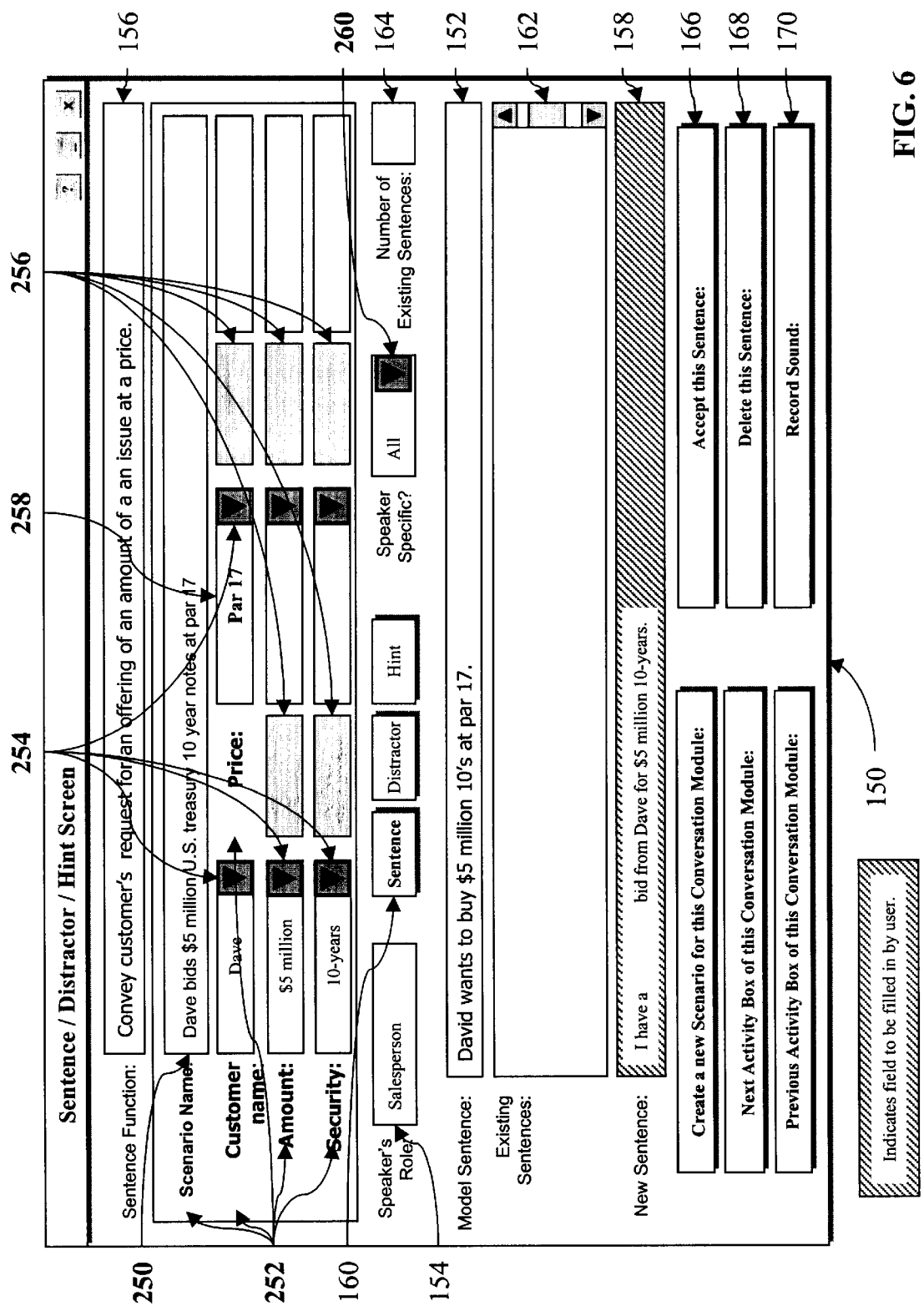
FIG. 6 is another schematic diagram of a sentence/distractor/hint screen that is substantially the same as the screen shown in FIG. 4

Turning now to a sentence/distractor/hint screen 249 in FIG. 6, an explanation is provided for the features not explained in FIG. 4. A scenario name field 252 displays the name of the scenario that was defined in field 204 on the scenario screen 200 in FIG. 5. The names of the variables selected on the scenario screen are now displayed in the variable fields 252. The author starts to type a sentence into a new sentence field 158. When the author gets to the point where he or she needs to enter one of the variables, the author can choose from among the values entered in the values 1, 2, and 3 in columns in 230, 232, and 234 by using the pull-down menu 254 on the appropriate variable field 252. This not only adds the appropriate text, it identifies the portion of the sentence that requires a variable.

In order to double the content, the author can click on a create a new scenario for this conversation module button 240. This leaves the entries in the variable name column 208, but clears the entries in all three value columns 230, 230 and 234. The author can now enter variations, such as "Susie" in variable 224, "Sue" in the variable 226, and "Ms. Quentin" in the variable 228. Once that has been completed, the system can now substitute these new values into the appropriate places in all of the sentences that have been created for this conversation module.

Returning now to FIG. 5, in order to understand the purpose of the source column 216 of the scenario screen 200, consider that as an author creates more and more content, he or she may find it useful to use some of the variables more than once. It would add realism to the content if the learner encountered a given customer in multiple situations. To facilitate that, a customer file 210 is provided. The customer file 210 can contain information about the address of each fictitious customer, their virtual transaction history, virtual financial information, and other data. In a different context, a file 212 might contain a real list of all securities issued by the United States government, to include the issue date, the coupon interest rate, the amount outstanding, and so on. The system allows the user to create files (not illustrated) that include relevant information about any of the variables. It is important to note that these variables could be almost anything, depending only on the context of the conversation module being created. For an insurance module, variables can include the face amount of a policy, or amount of monthly premiums. For a call center operator, the variables can relate to the product line of the company, or its delivery options. This gives the author a great deal of flexibility in designing the course.

Once created, the files serve as sources for variables that can be included in relevant content. Once the author has selected an option from the source file 216, appropriate values from the customer file 210 are automatically entered into the pull-down menus 220 and 222 of the value 1, value 2, and value 3 columns 230, 232, and 234. For example, if the author chooses Armada Bank (a fictitious customer) from the customer file 210, the pull-down menu 220 might say that the name of the virtual contact at that institution is David Hatch. In order to have a conversational tone, it could then let the author select that name, or a common nickname used to refer to this character. In this example, the author has chosen "Dave" in variable 226 from a pull-down list. If there are alternative names that can be used as values for referring to this person, such as "David" as shown in variable 228 or "Mr. Hatch" as shown in column 230, these can be selected in the value 2 or value 3 columns 232 and 234.

Some variables, such as an amount or a price, are chosen at random in the boxes 214. If the author selects that option, no values are automatically chosen, and the author may enter whatever value is appropriate. In the interests of reality, the customer file 210 may also contain user-defined information about the customer's virtual personality characteristics. For example, one customer may be very polite, another rude and arrogant. One might have a Brooklyn accent, and another speak in broken or heavily accented English. This information can help the author to create a consistent feel when the learner deals with this virtual character. By right-clicking on the value "Dave" variable 224 in the value 1 column 230, the author can see this information in order to review it. By double-clicking on it, the author can edit the information. If sentences are created that are designed to be used only by one character, the author can identify them by clicking on a speaker specific button 260. This gives a pull-down list of all characters that have been identified in the value columns 230, 232 and 234. The default for this button is "all," meaning that any speaker can use that sentence.

In the example described, there is only one scenario defined. Thus, the fields labeled 236 and 238, labeled "View Previous Scenario for this Conversation Module" and "View Next Scenario for this Conversation Module," respectively, are both grayed out. In order to define a new scenario, the author simply clicks on the button 240, which in the example is labeled "Create a New Scenario for this Conversation Module." Finally, the author can accept a scenario by selecting an accept this scenario button 242. Editing and deleting are accomplished by choosing an edit this scenario button 244 and a delete this scenario button 246.

It should be readily apparent to one skilled in the art that the ability to have a system that leverages existing content provides a significant ability to create large amounts of scenes, situations, or conversations that a learner can observe. The distractor and hint capabilities allow the learner to participate in a highly interactive way with the course materials whenever they feel ready. More specific details regarding the invention are provided in the following.

Figure 7:
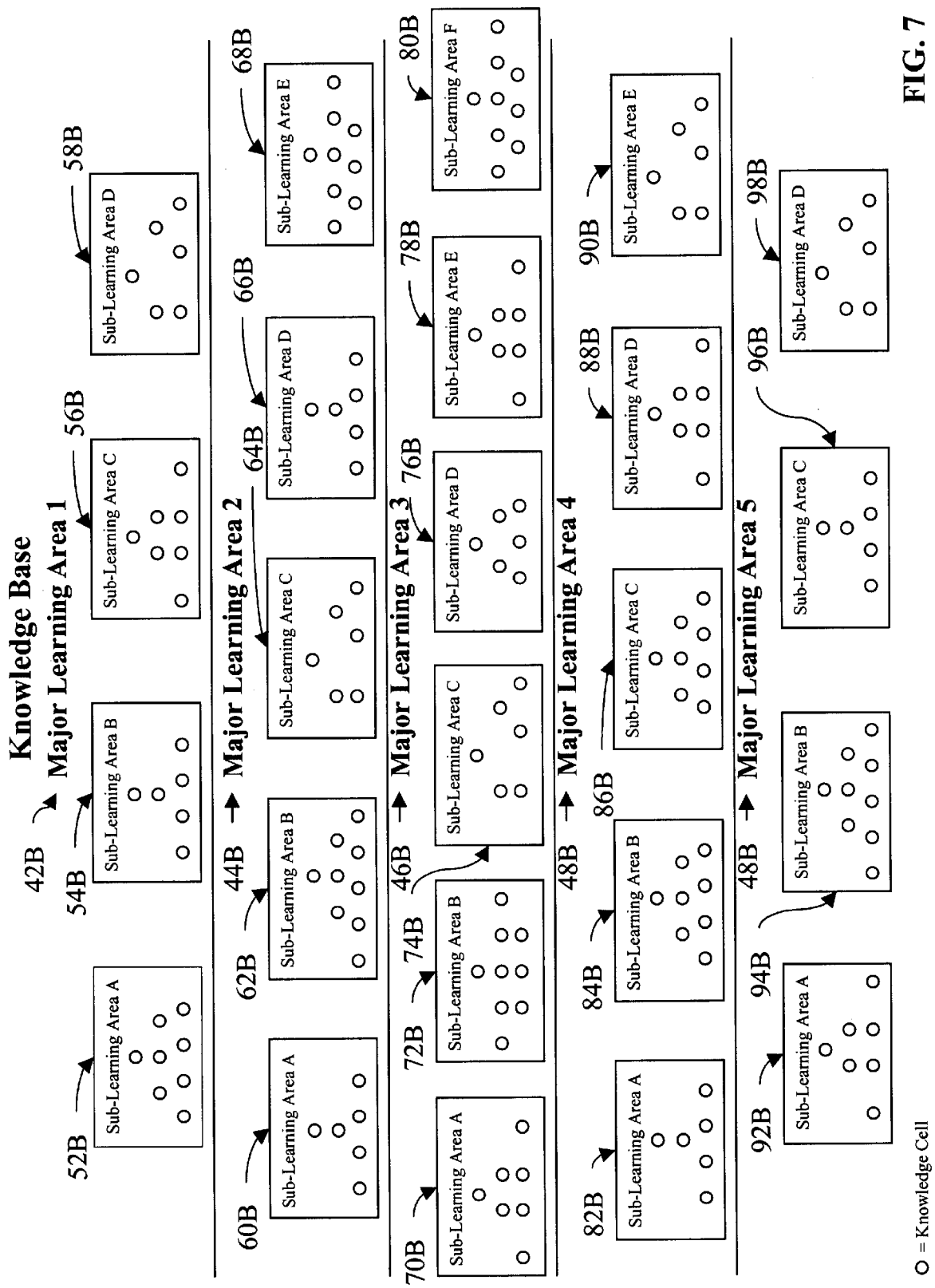
FIG. 7 is a schematic diagram of interactive learning content organized in five major learning areas.
Figure 8:
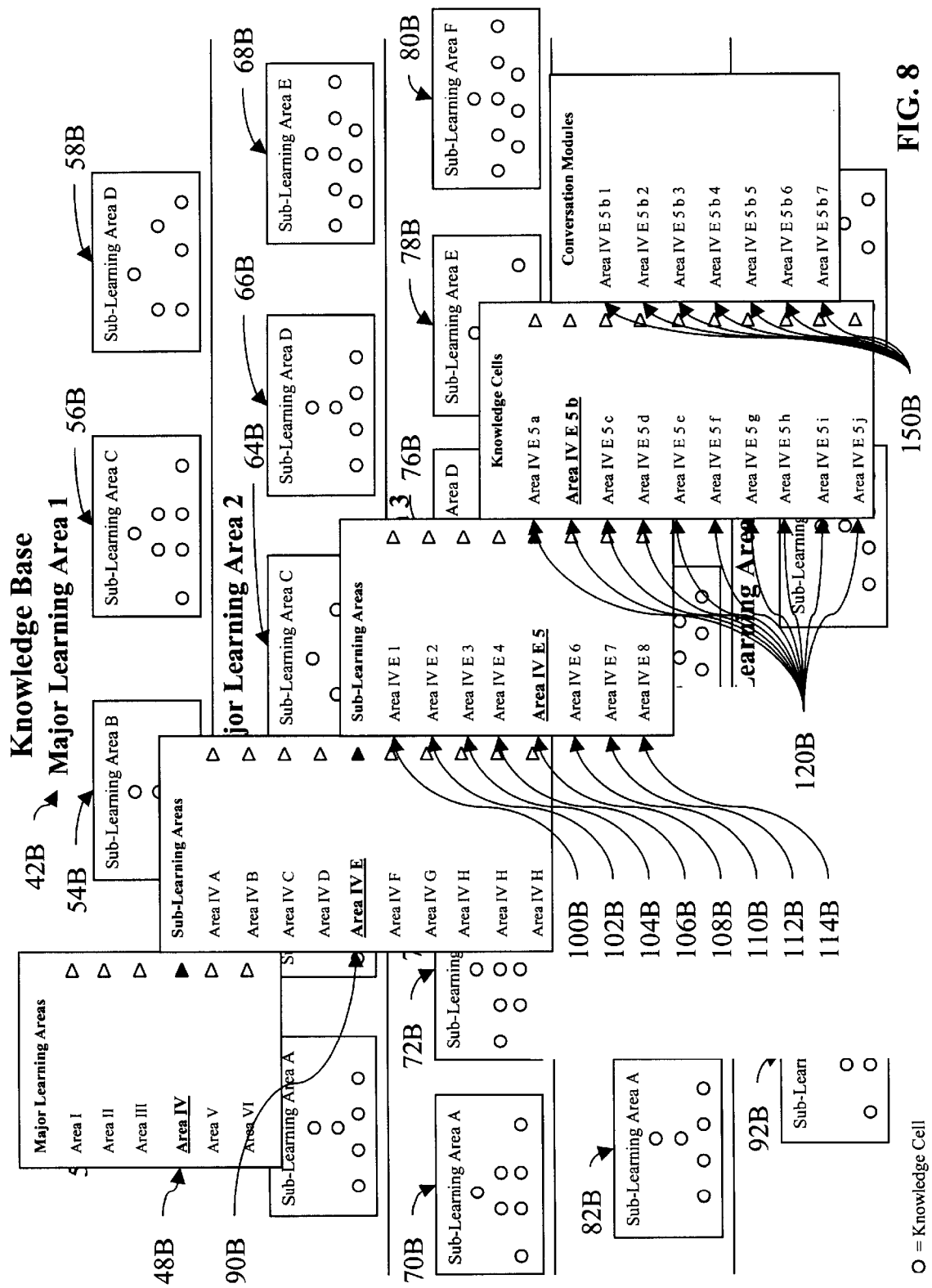
FIG. 8 is a schematic diagram of interactive learning content organized into sub-learning areas, knowledge cells, and conversation paths.

The learning content 39 may include multiple learning units organized in the same fashion. As best seen by reference to FIG. 7, a learning unit may be organized or segmented into several components. In particular, a learning unit of the learning content 39 includes a plurality of major learning areas such as major learning areas 42B–50B. Each major learning area 42B–50B includes one or more first sublearning areas. For example, major learning area 42B includes first sub-learning areas 52B–58B. Likewise major learning areas 44B–50B include first sub-learning areas 60B–68B, 70B–80B, 82B–90B and 92B–98B, respectively. As best seen by reference to FIG. 8, first sub-learning areas 52B–58B, 60B–68B, 70B–80B, 82B–90B, and 92B–98B may be further divided into second sub-learning areas 100B–114B. Each first sub-learning area or, if second sub-learning areas are used, each second sub-learning area may include one or more knowledge cells 120B. Each knowledge cell may include one or more conversational paths 150B.

Figure 9:
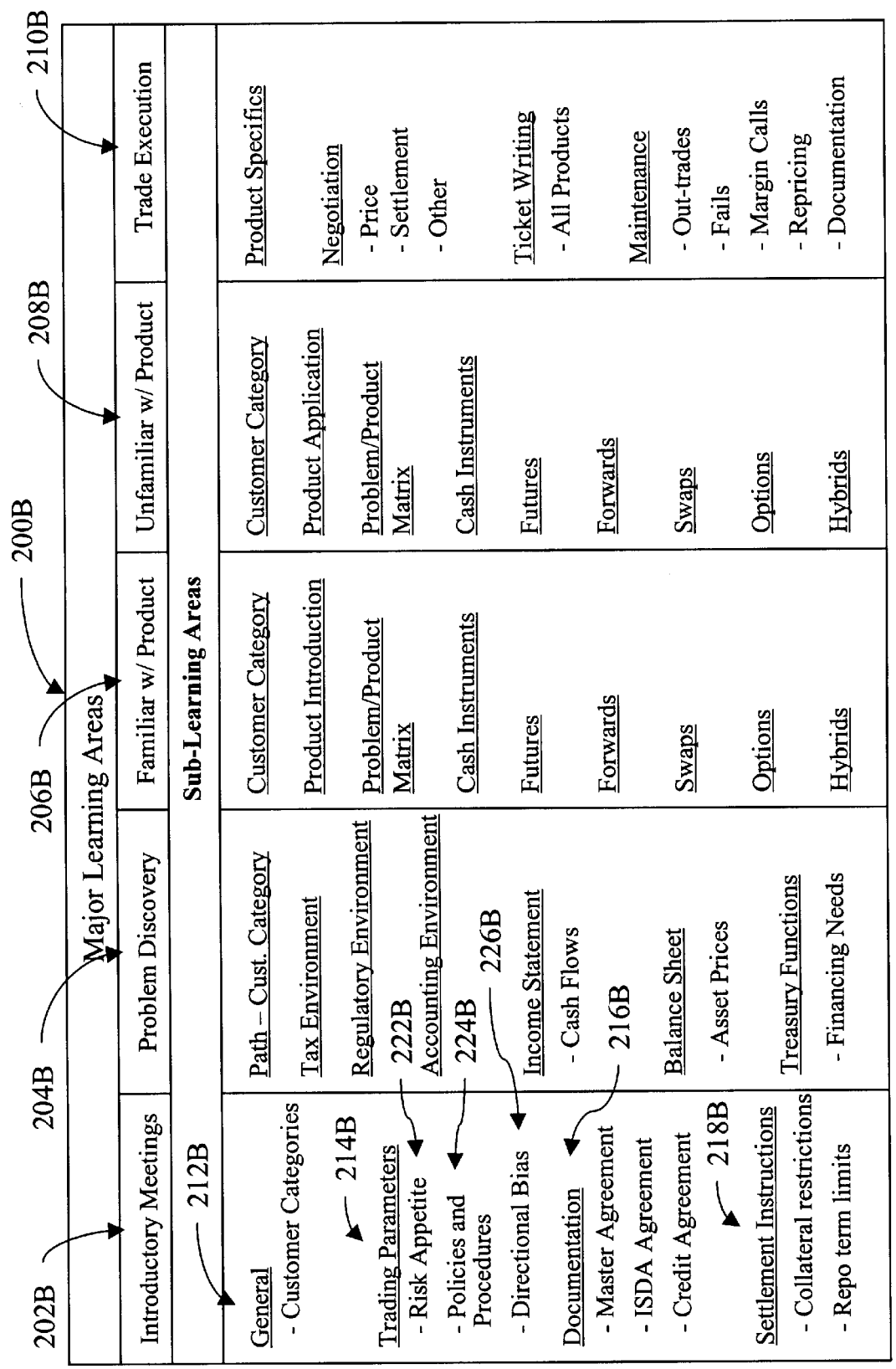
FIG. 9 is a user profile showing user proficiency is subject matters contained within interactive learning content.

The architecture of the interactive learning content 40B, as described thus far, is better understood by reference to FIG. 9, which illustrates an exemplary learning unit 200B for teaching an individual securities trading. Learning content 200B includes an introductory meetings area 202B, a problem discovery area 204B, a first solution proposal area 206B, a second solution proposal area 208B and a trade execution/follow-up area 210B. Each area 202B–210B includes sub-areas. For example, the area 202B includes a general sub-area 212B, a discover trading/hedge parameters sub-area 214B, a secure documentation sub-area 216B, and a delivery and settlement instructions sub-area 218B. Each sub-area has knowledge cells such as risk appetite, policies and procedures, and directional bias knowledge cells 222B–226B.

The interactive content 39 is configured such that sub-learning areas may be studied in a conversational manner.

This conversational learning technique allows for learning in a manner which is similar to that which occurs when a mentor and apprentice role play or when an apprentice shadows a mentor, observing the mentor in action.

Figure 10:
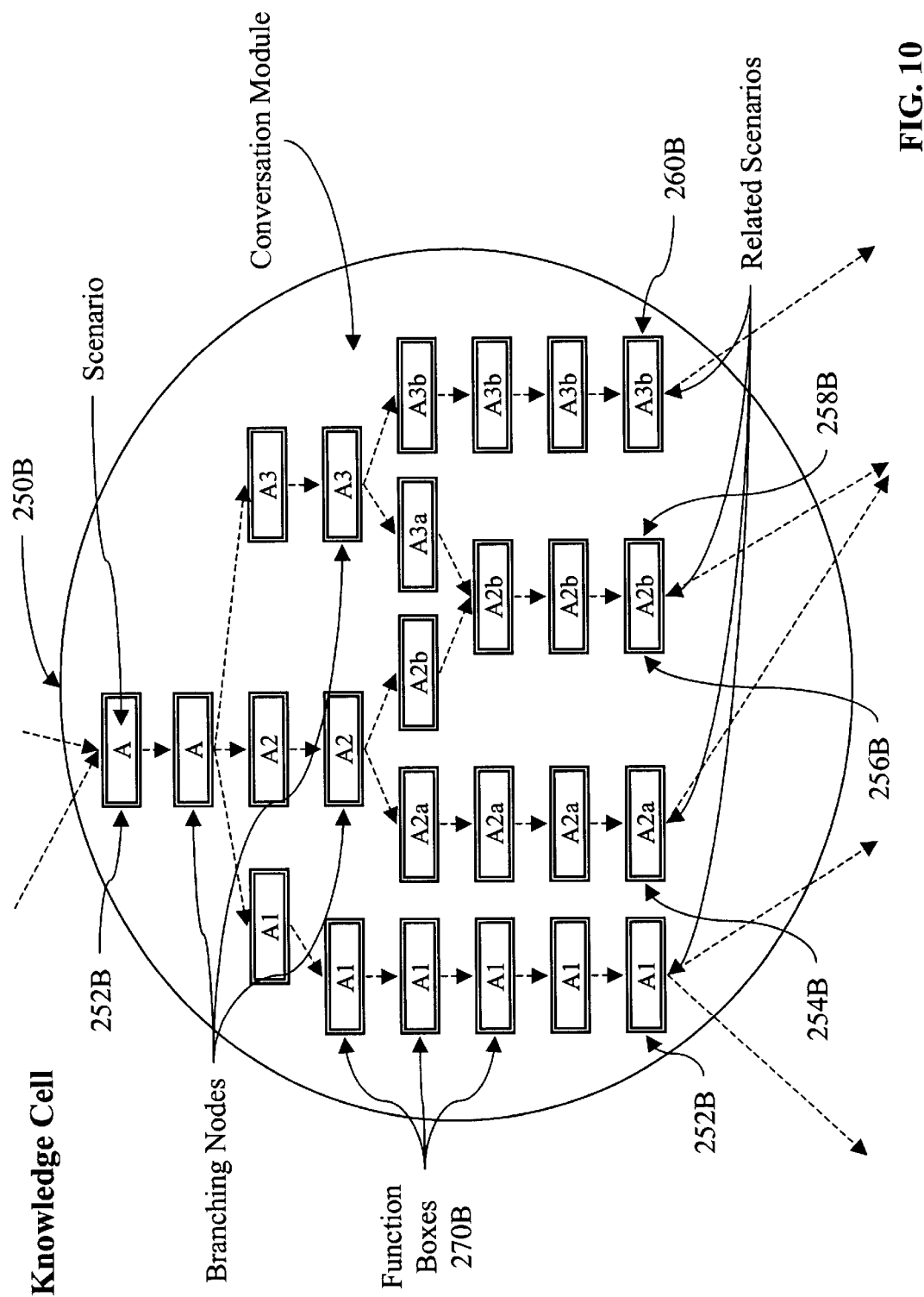
FIG. 10 is a schematic diagram of a knowledge cell illustrating multiple conversation paths.
Figure 11:
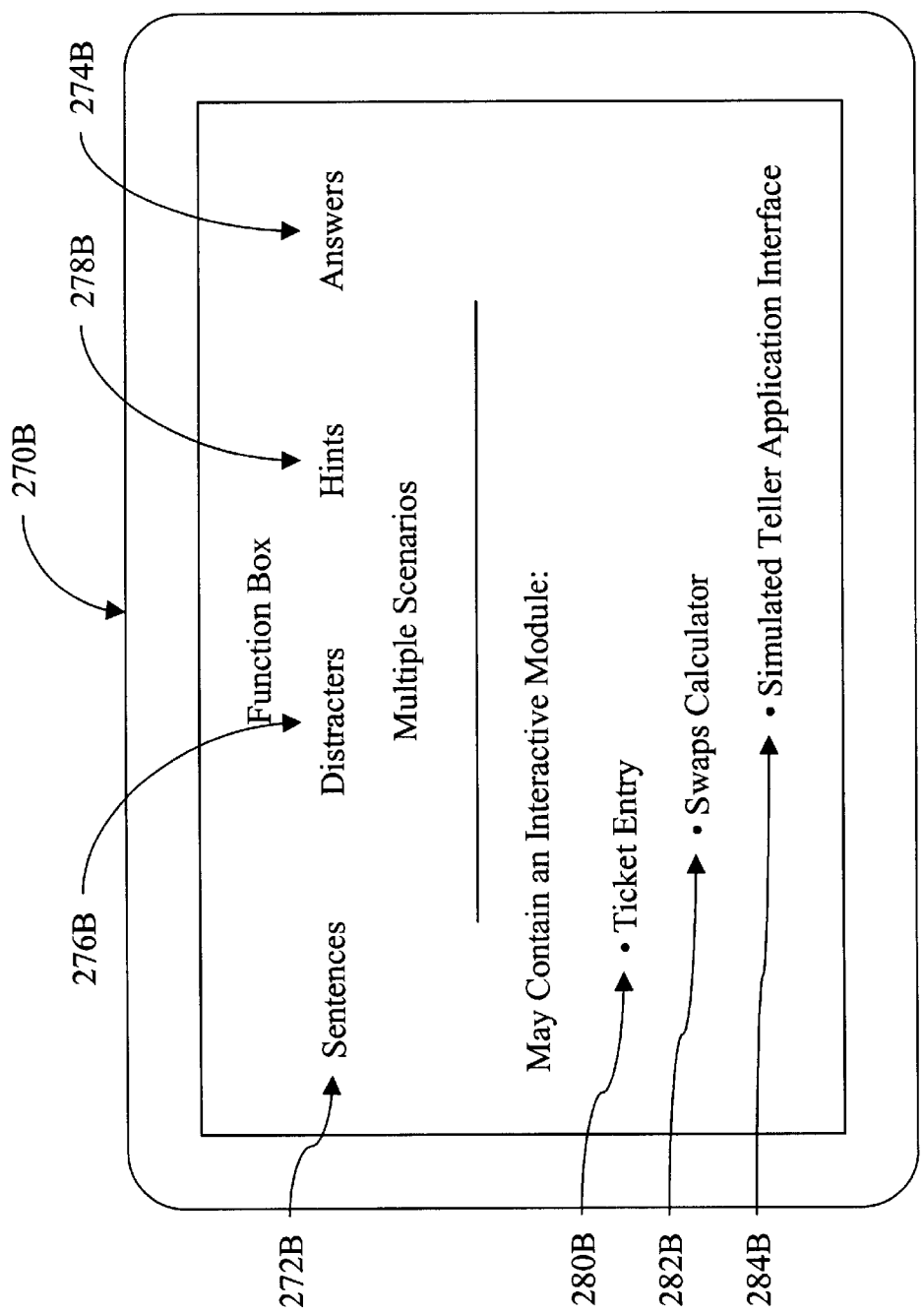
FIG. 11 is a schematic diagram of a function box.

A knowledge cell 250B with multiple conversational paths 252B–260B is shown in FIG. 10. Each conversation path represents a real life scenario where a learner would use certain skills to respond to the circumstances. Each conversation path includes one or more function boxes 270B. As shown in FIG. 11, each function box includes one or more sentences 272B, which represent problems or tasks presented to the learner. In addition to the sentences, each function box includes a correct answer 274B and one or more distractors 276B. Hints 278B may be provided near the correct answer 274B and distractors 276B to assist a learner in selecting the correct answer 274B. In addition to the sentences, answer, distractors, and hints, each function box may include a virtual representation of a user interface or a machine used for the job or position. Such machines might include a ticket entry machine 280B, a swaps calculator 282B, or a teller machine 284B (shown schematically). The function box represents the display generated by the training module (which is transferred to the client 12) and ultimately presented on a monitor (not shown) coupled to the client. A group of conversation paths is referred to as a conversation module. An example of the content and conversational technique implemented by the invention is shown in FIG. 12.

Figure 12:
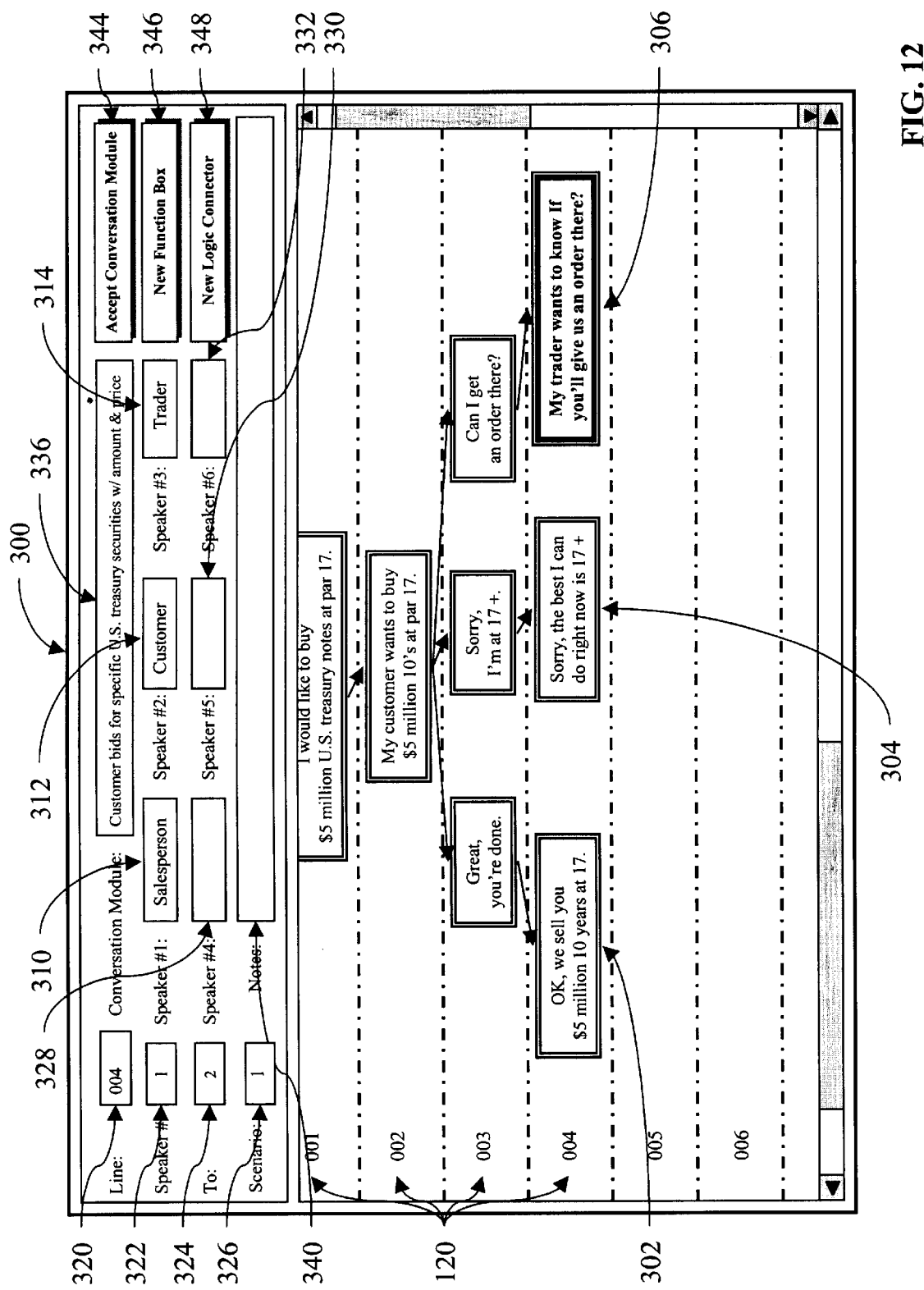
FIG. 12 is an illustration of an authoring tool interface.

FIG. 12 illustrates an authoring tool 300. The authoring tool 300 includes partially constructed conversation paths 302–306. The authoring tool 300 allows the creation of conversation modules. In particular, the authoring tool facilitates the creation of sentences for function boxes. The sentences are typical of dialog that occurs in work-place situation. In the example shown, a student broker 310, a customer 312, and a trader 314 are involved in a securities transaction. The three conversation paths 302–306 represent three different scenarios, each with a common starting point, where the customer 312 asks the student broker 310 to buy a certain amount of a security at a certain price. The student then relays the purchase request to the trader who responds in one of three ways. Replies to each of the traders responses are provided for the student broker 310. The authoring tool provides input dialog boxes 320–326 to designate the level or line in which the conversation is taking place, the active speaker, the listener, and the scenario, respectively. A plurality of dialog boxes 328–332 is provided for naming or otherwise identifying other speakers or characters in the conversation module. A conversation name dialog box 336 and notes dialog box 340 are also provided. Finally, input mechanisms 344–348 are also provided. These input mechanisms allow a user to accept a conversation module, to add a new function box, and to make a connection between function boxes, respectively.

Figure 13:
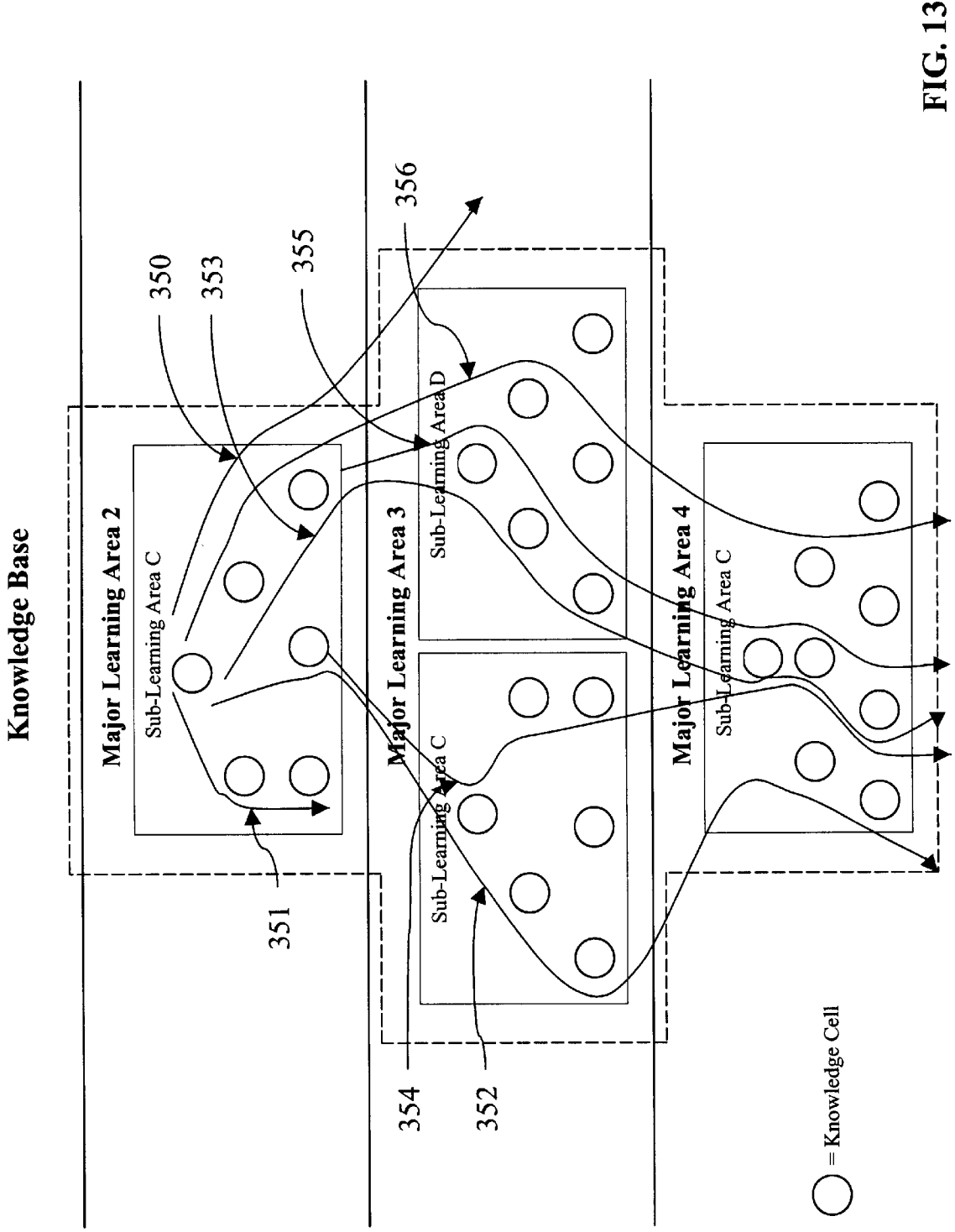
FIG. 13 is an illustration of conversation paths crossing over multiple learning areas.
Figure 14:
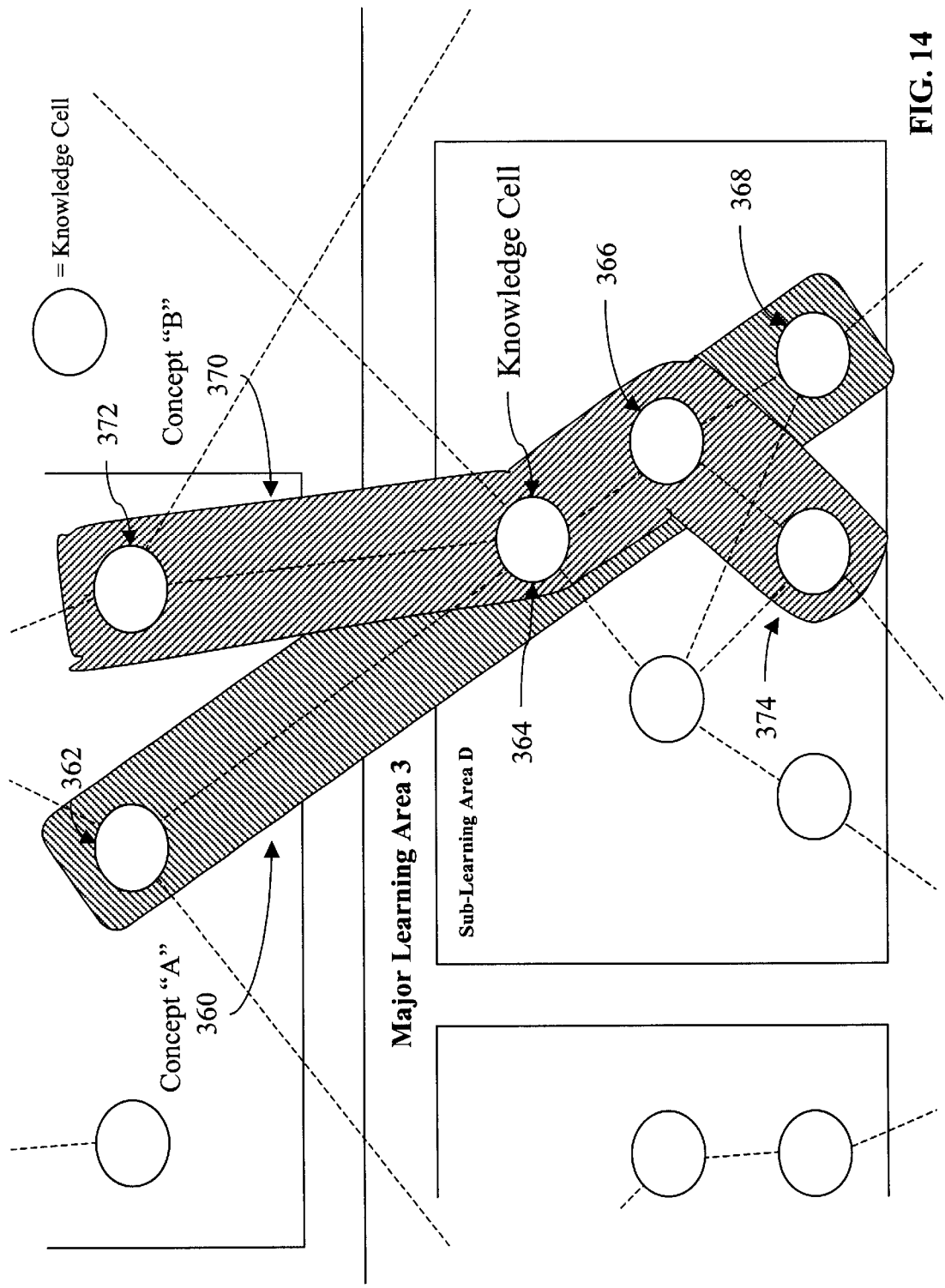
FIG. 14 is an illustration of concepts sharing overlapping knowledge cells.

As best seen by reference to FIG. 13, conversation paths 350–356 may be linked from one sub learning area to another such that the conversation paths cross from one major learning area to another. In this way, "concepts" may be developed and taught in a natural way, and follow a natural sequence of events. FIG. 14 illustrates how concepts may overlap. A concept 360, which includes knowledge cells 362–368, overlaps a concept 370, which includes knowledge cells 372, 364, 366, and 374. While concepts traverse major learning areas, within an individual knowledge cell multiple conversation paths or multiple conversation path segments may be followed. Moreover, by changing certain variables, the same conversation paths or path segments may be followed to generate different scenarios. The relationship of concepts to conversation modules is illustrated in FIG. 15.

Figure 15:
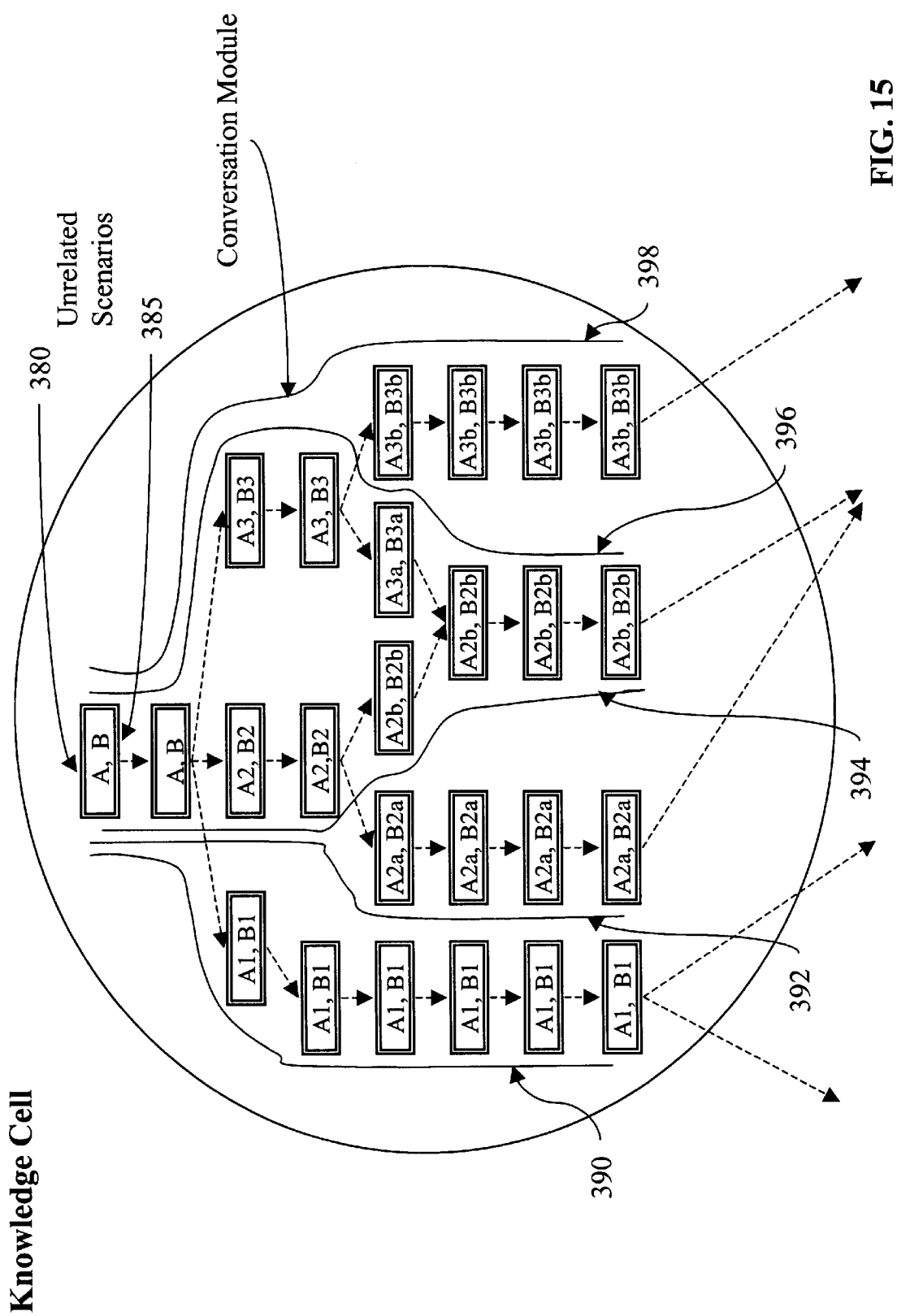
FIG. 15 is an illustration of multiple scenarios following the same conversation paths.
Figure 16:
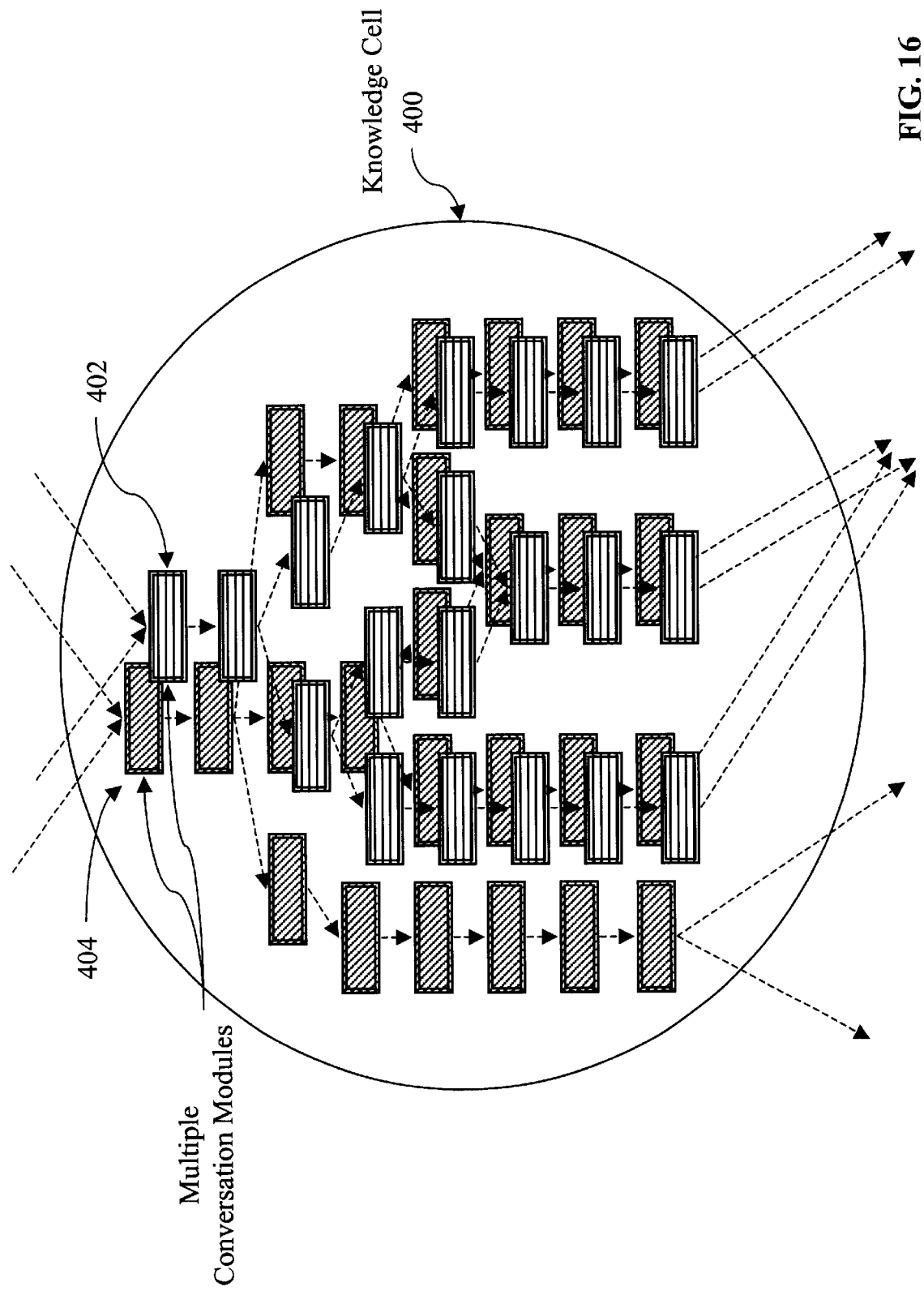
FIG. 16 is an illustration of a knowledge cell with multiple conversation modules each having unique conversation paths.
Figure 17:
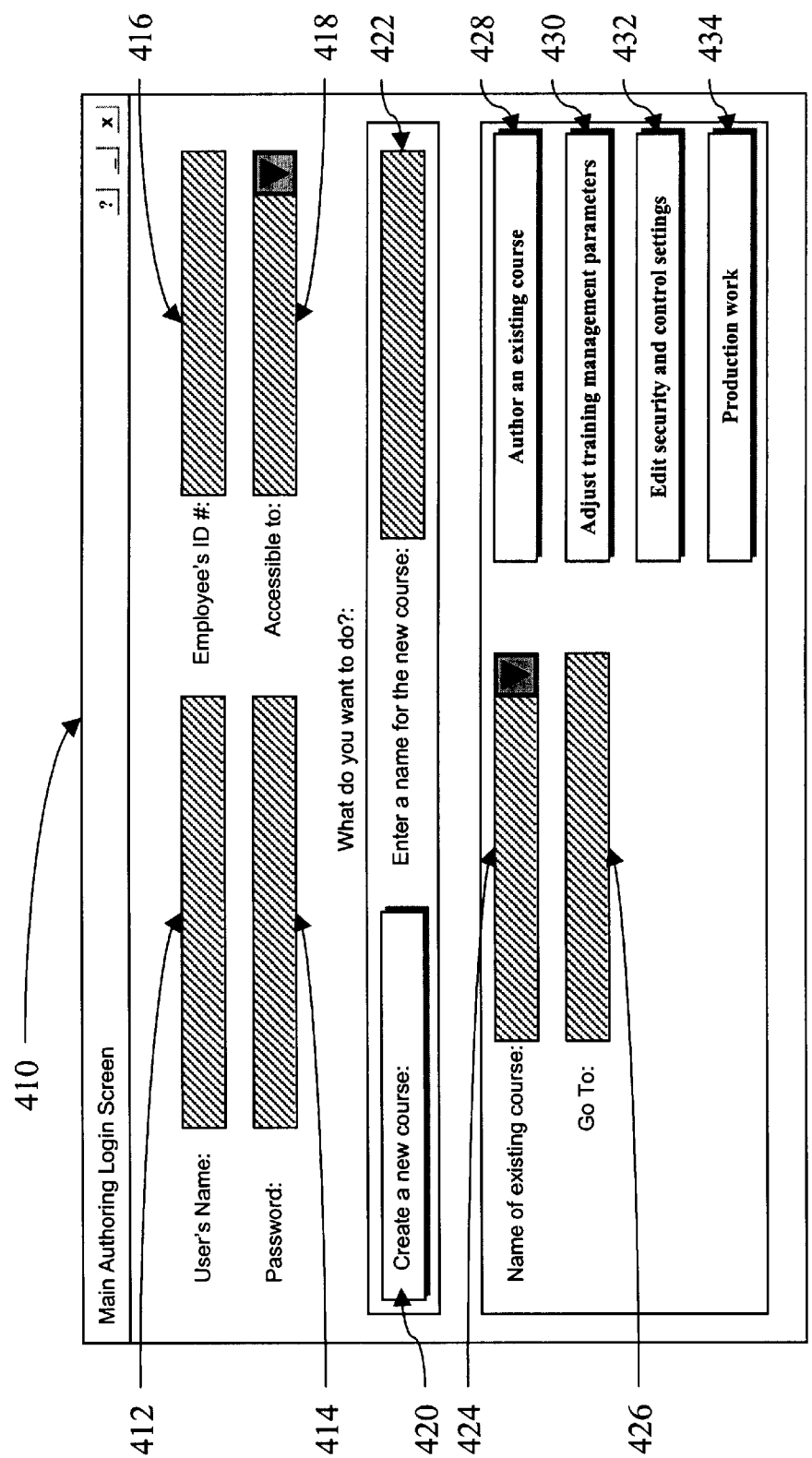
FIG. 17 is a depiction of a main authoring screen of the invention.

Two unrelated scenarios are show in FIG. 15. The first scenario is based on a set of variables (A-A3b) and the second scenario is based on a set of variables (B-B3b). Each scenario has five possible conversation paths 390-398. Thus, using a multiplier (a device that changes or multiplies variables) numerous possible scenarios may be implemented using static, content organizational structure. By multiplying the content organizational structure, as shown in FIG. 16, even greater variation may be created such that multiple conversation modules exist within a single knowledge cell. As shown in FIG. 16, a knowledge cell 400 includes conversation modules 402 and 404. even greater variation may be created such that multiple conversation modules exist within a single knowledge cell. As shown in FIG. 16, a knowledge cell 400 includes conversation modules 402 and 404.

The interface provided by the system to carry out authoring and editing functions is shown in FIGS. 12–18. A main authoring login screen 410 includes dialog boxes 412–418 to accept input for the user's name, password, employer ID, and security access level, respectively. After entering the appropriate information in boxes 412–418, the user is provided a choice to create a new course in a dialog box 420, to edit an existing course, or to edit certain parameters for existing courses by selecting controls 424–434.

Figure 21:
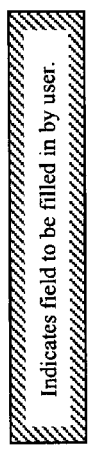
FIG. 21 is a depiction of a knowledge cell screen of the invention.
Figure 22:
FIG. 22 is a depiction of a function box screen of the invention.

If a user decides to create a new course, the system 10 generates a new course screen 450 (FIG. 18) to permit the user to input objective information, file numbers, notes, create a file for the new course, and add, edit, or delete a major learning area to the new course. If the user decides to choose the add/edit/delete choice, the system 10 generates an add/edit/delete screen 470 (FIG. 19) with dialog boxes to designate a major learning area, a learning area location, a major learning area objective, introduction files, and a course objective. Selection buttons allow the user to accept the new or edited learning area, to delete the learning area, add the major learning area, or add, edit, or delete a sub-area to the selected major learning area. If the add/edit/delete a sub-area choice is selected, the system 10 presents the user with a sub-area add/edit/delete screen 520 (FIG. 20) with similar options as those in the screen 470. In addition, the add/edit/delete screen 520 includes selection buttons 540 and 542 to add and edit or delete knowledge cells. If the user selects one of the buttons 540 or 542, he or she is presented with a knowledge cell screen 600 (FIG. 21), which includes dialog boxes to edit knowledge cells. A user may also choose to add a conversation module to the knowledge cell by selecting a conversation module button 620. Selecting a conversation module 620 brings the user to a function box screen 720 (FIG. 22). Finally the system 10 generates a scenario screen 820 (FIG. 23).

Once the learning content 40 has been generated using the tools and according to the architecture described above, the system 10 may be accessed by a prospective job candidate for the purposes of testing his or her proficiency and learning new job skills. Of course, as described above, one of the advantages of the invention is that a job candidate with appropriate access authority may create his or her own content.

Figure 24:
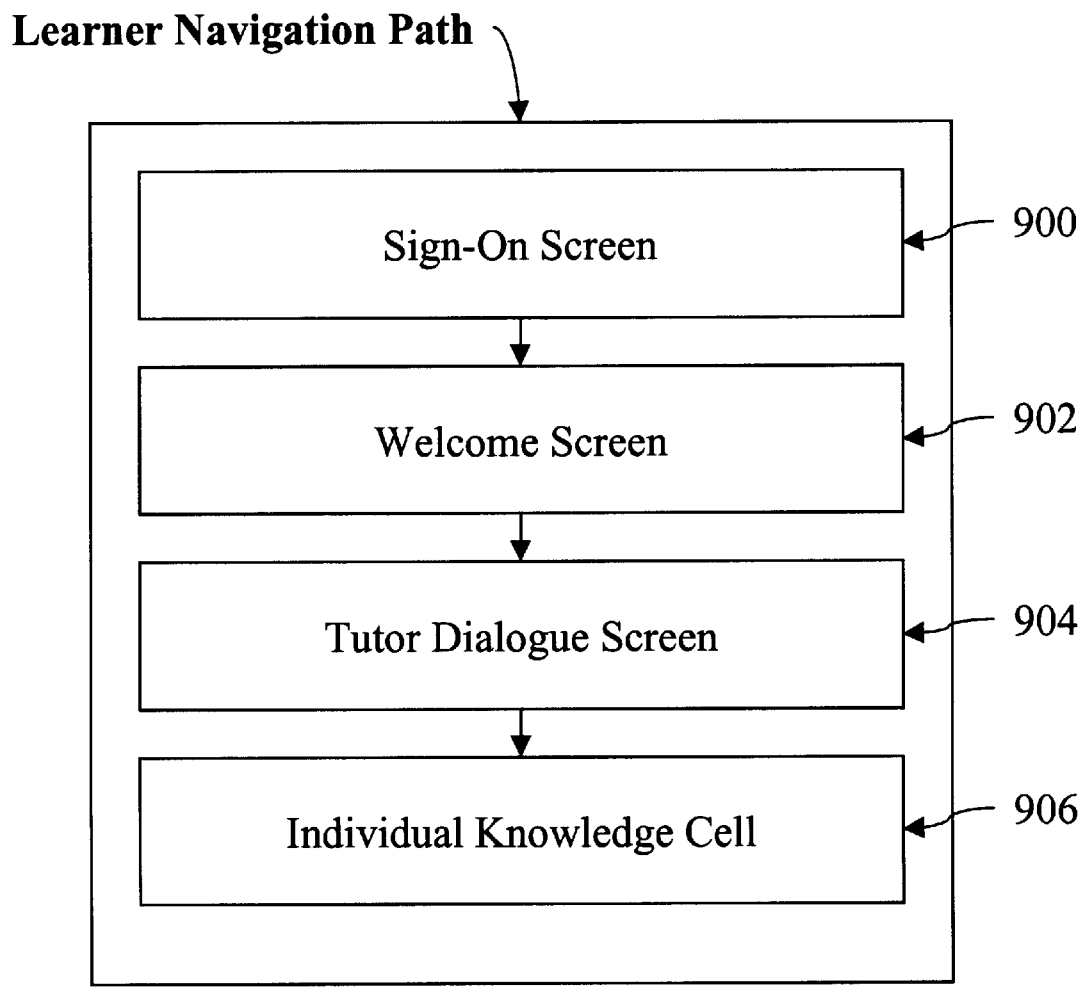
FIG. 24 is a flowchart of the general learner acquisition path provided by the invention.

FIG. 24 shows the basic navigation path followed by a user of the system 10. First the user signs on at step 900 (by entering a user name and password, for example). The user is then presented with a welcome screen at step 902. The welcome screen displays a list of available courses and allows a user to select one of the listed courses. The user is then presented at step 904 with a tutor dialog screen, which allows a user to select a learning area or have the system select a learning area for the user. Finally, the user is presented with information from individual knowledge cells, as represented by step 906. The operation of the welcome screen and the tutor dialog screen is illustrated in more detail in FIGS. 25 and 26. However, since the two screens operate in a straightforward manner, they will not be discussed in detail herein.

Figure 27:
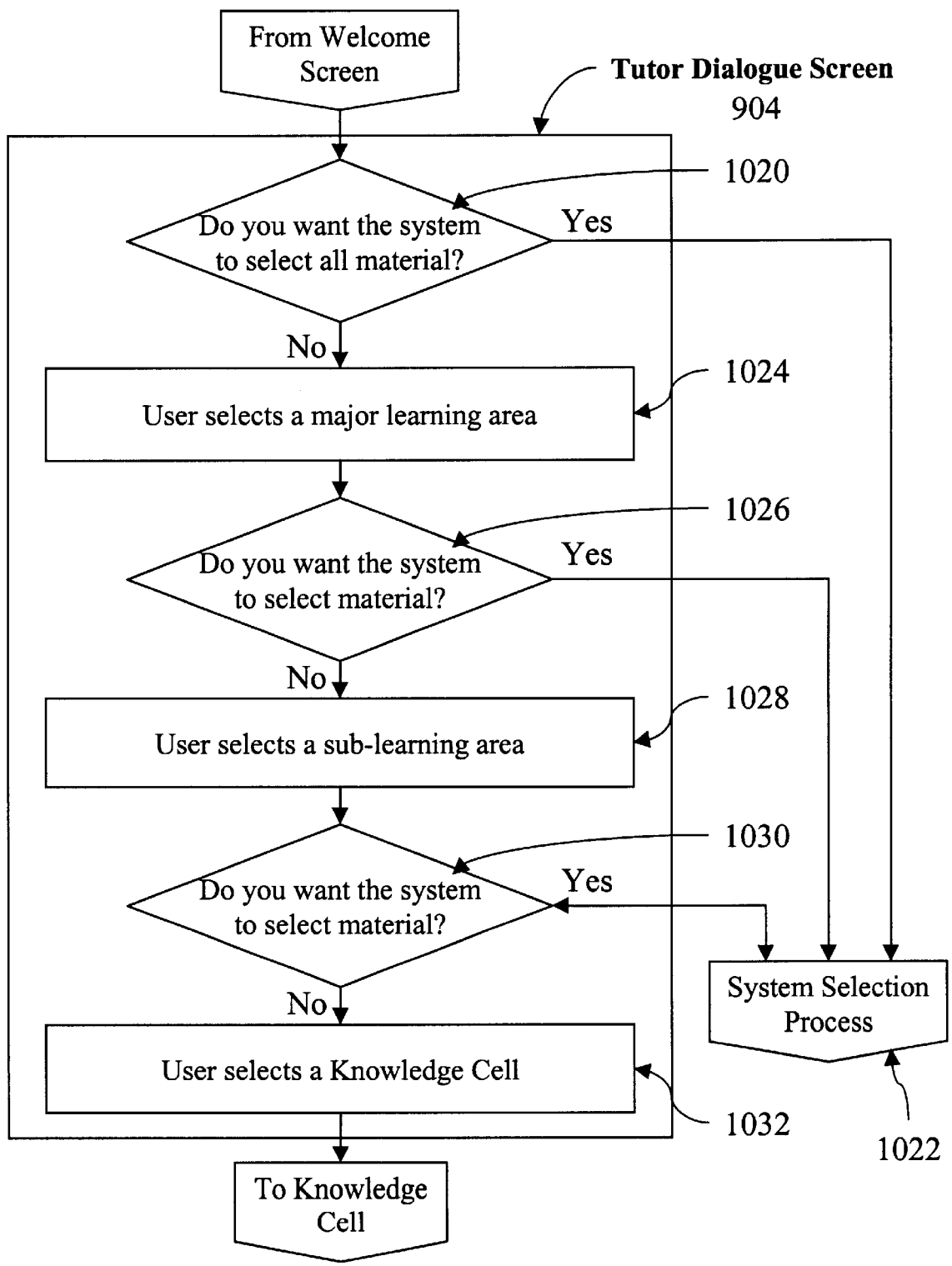
FIG. 27 is a flowchart of the subject matter selection process implemented by the invention.

FIG. 27 illustrates the procedures that the system 10 allows the user to implement using a tutor dialog screen. At step 1020, the system queries the user as to whether the system should automatically select the material the user will review. If the answer to the question is yes, then a system selection process is implemented at step 1022. If the answer is no, the user selects a major learning area at step 1024. As shown at step 1026, the system then queries the user as to whether the user would like the system to select a sub-learning area. If the answer is yes, then the system automatically makes a selection in a system selection process as shown at step 1022. If the answer is no, the user manually selects a sub-learning area as shown at step 1028. Finally, the system then queries the user whether a knowledge cell should be automatically selected. If the answer is yes, then the selection process as shown at step 1022 is implemented. Otherwise the user selects a knowledge cell as shown at step 1032.

Figure 28:
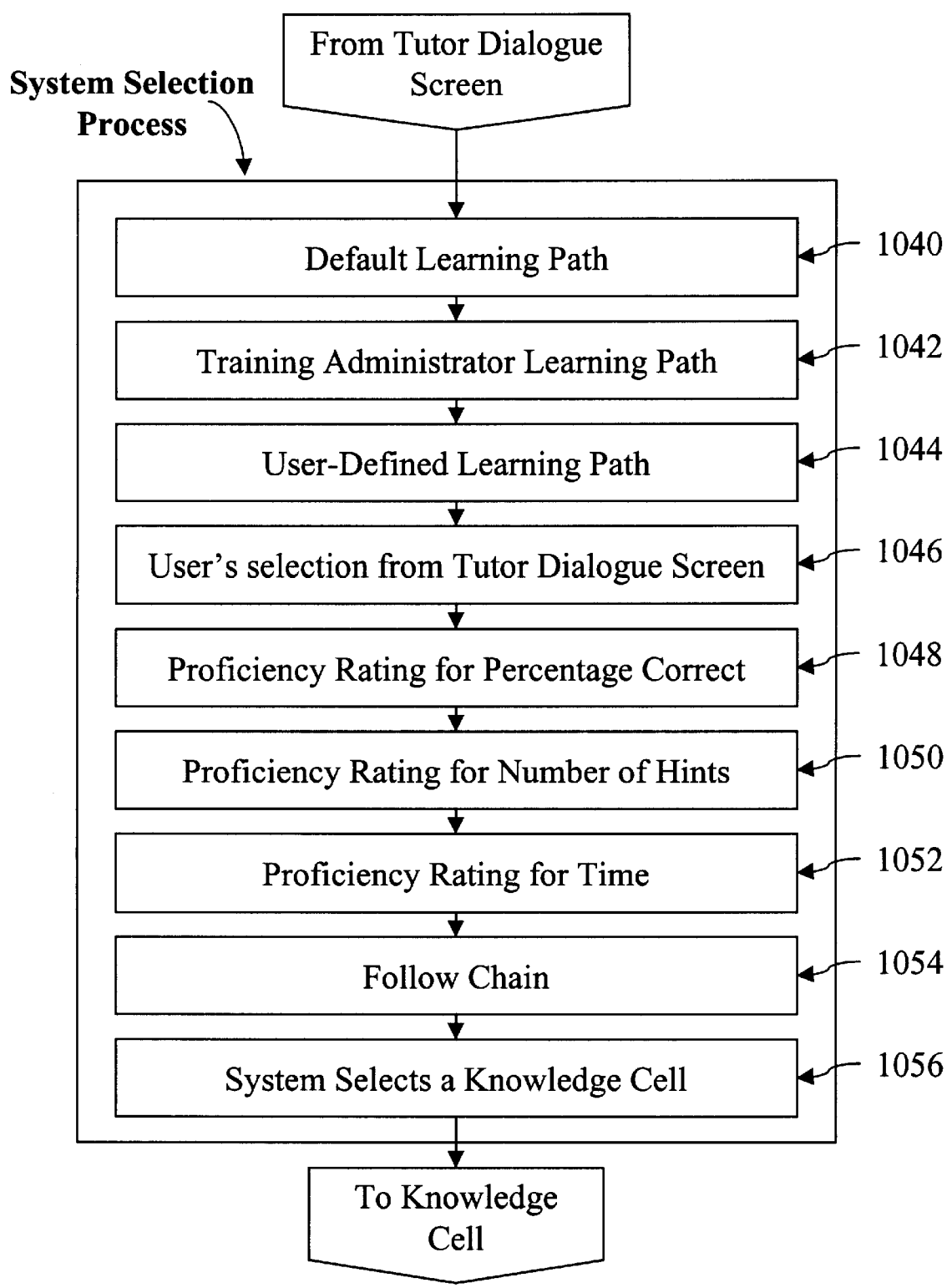
FIG. 28 is a flowchart of the selection process of subject matter implemented by the invention.

The selection process as shown in step 1022 is shown in more detail in FIG. 28. The system selection process first determines whether a default learning path, a training administer learning path, or a user defined learning path has been defined in steps 1040, 1042, and 1044, respectively. The system selection process then checks to see whether the user has made specific selections for the learning path to be followed at step 1046. The system selection process follows the user selections, the default training administrator path, or the user defined learning path. The learning path has been modified according to the proficiency rating of the user. The proficiency rating is adjusted based upon the number of the correct answers, the number of hints used, and the time needed to provide answers, as shown in steps 1048, 1050, and 1052. The path defined by the above steps is then implemented at step 1054. The path then leads to a specific knowledge cell, which is selected at step 1056.

Figure 29:
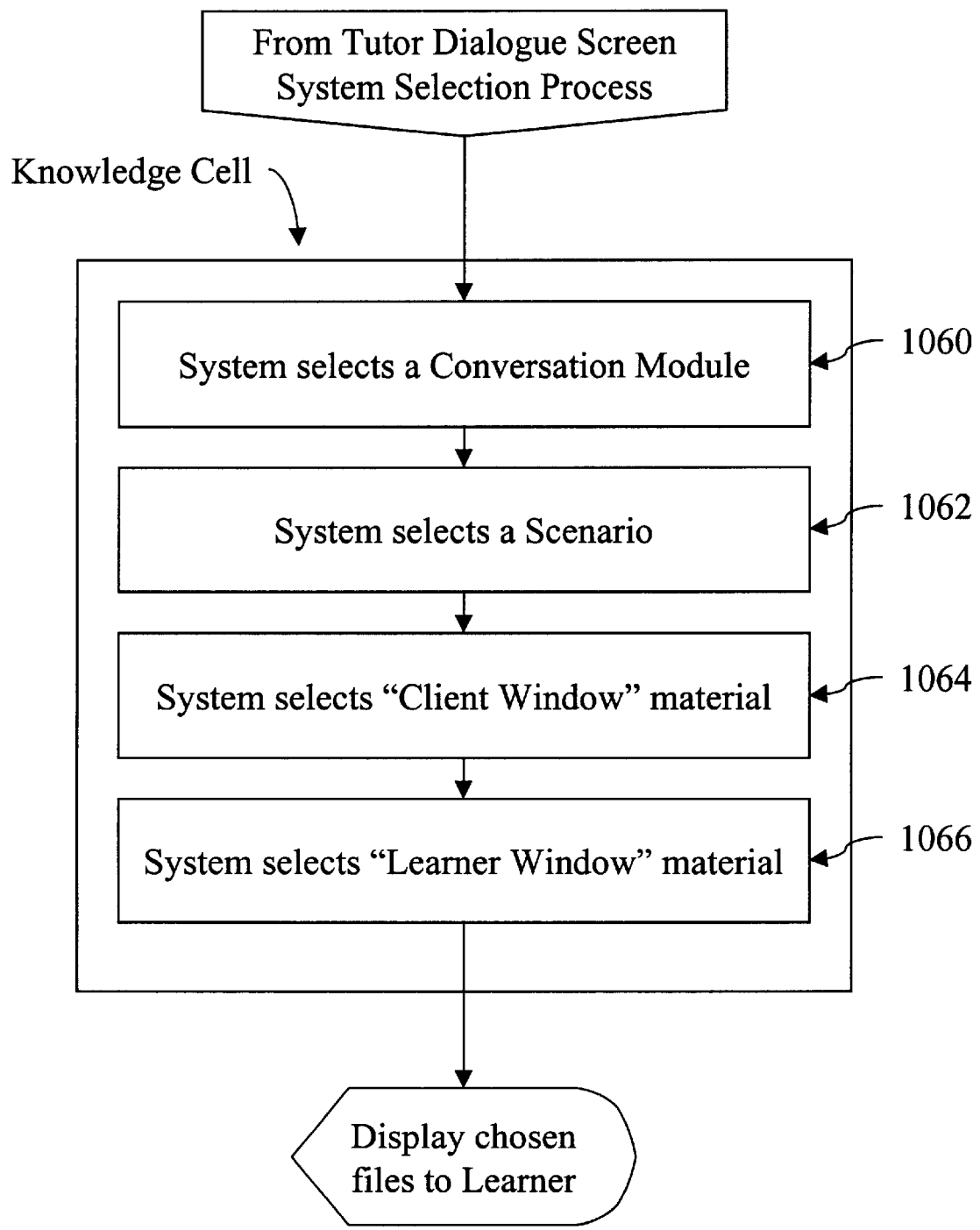
FIG. 29 is a flowchart of the file selection process implemented by the invention.

As shown in FIG. 29, once the system has selected a knowledge cell, the system then selects a conversation module and scenario at step 1060 and step 1062, respectively. Then the system collects the client window material and the learner window material in step 1064 and step 1066, respectively. Once these steps have been implemented, the available files are displayed to the learner.

Figure 25:
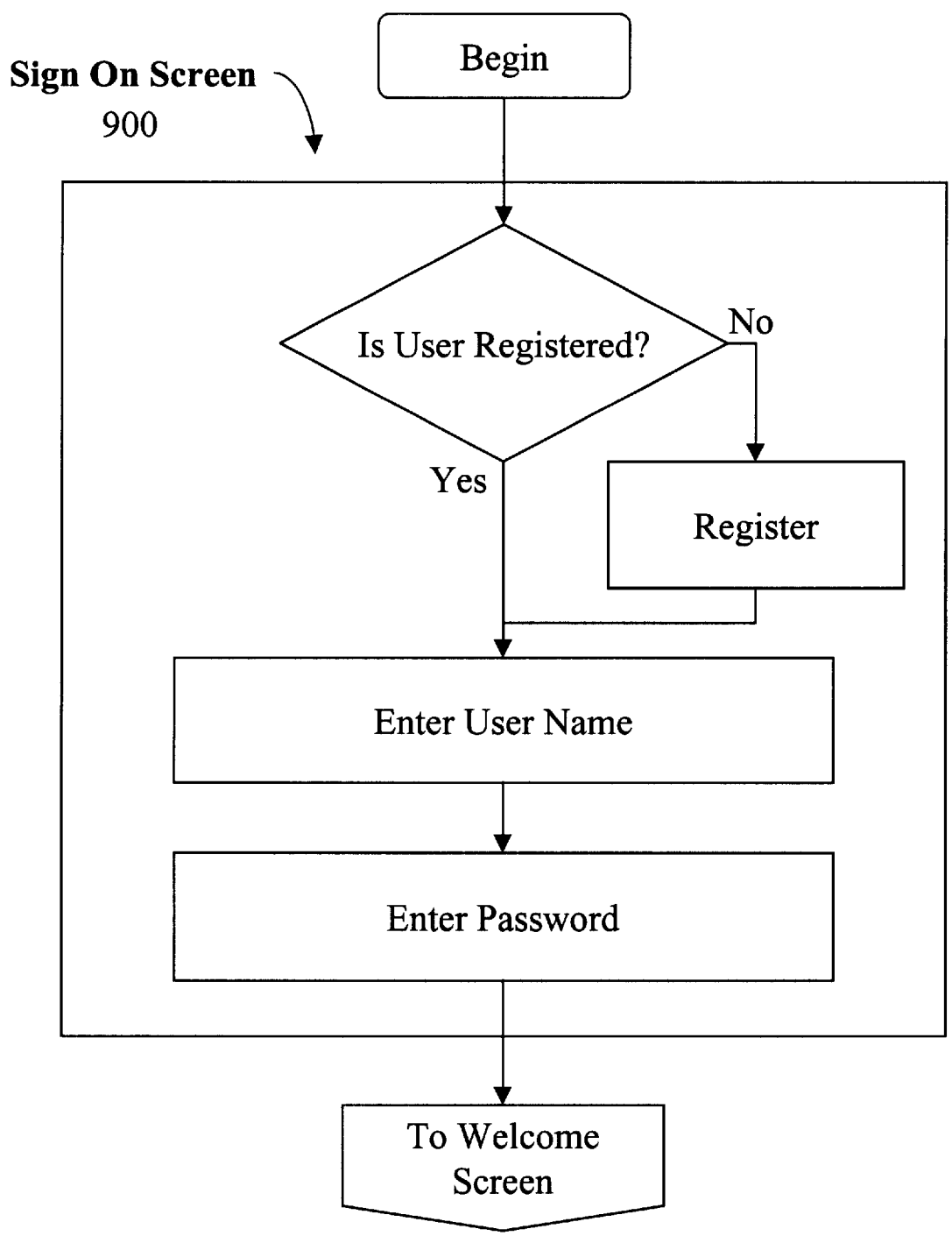
FIG. 25 is a flowchart of the sign-on process implemented by the invention.
Figure 26:
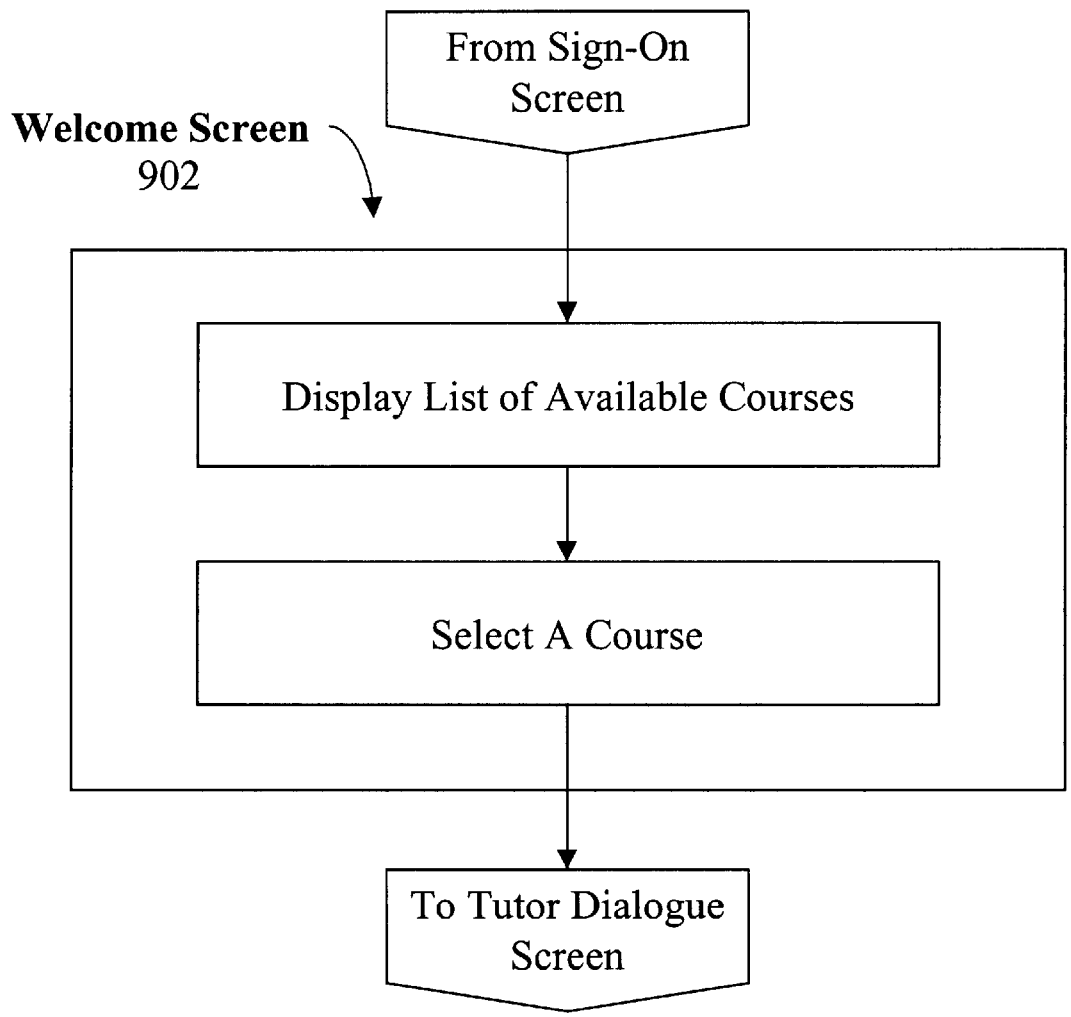
FIG. 26 is a flowchart of the course selection process implemented by the invention.

The procedures followed by the system to identify a major learning area, a sub-learning area, and a knowledge cell are shown in more detail in FIGS. 25, 26, and 27. As shown at step 1070 in FIG. 20, if a learner has selected a specific major learning area, the system then goes directly to that selected learning area as shown at step 1072. If the user has not selected a specific major learning area, the system then determines whether the learner has just started a learning session at step 1074. If the session is just beginning, the system then determines whether an administrator has chosen a learning path as shown at step 1076. If the session is not beginning, then the system determines at step 1078 whether there is an active scenario. If there is no active scenario, the system then returns to step 1076. If there is an active scenario, then the system determines whether there was a choice of conversation modules for the particular scenario at step 1080. Referring now back to step 1076, if an administrator has chosen a learning path, then the system determines if there is a choice of major learning area at step 1082. If an administrator has not chosen a path, the system then determines whether the learner has chosen a learning path at step 1084. If the learner has chosen a learning path, the system then goes to step 1082. If a learner has not chosen a learning path, the system then determines whether there is a default learning path as shown at step 1086. If there is a default learning path, the system returns to step 1082. If there is no default learning path, the system then determines whether the learner has a proficiency rating at step 1088.

Referring back to step 1082, if there is a choice of major learning area, the system then determines whether the learner wants to choose the major learning area at step 1090. If the learner does not want to choose the major learning area, the system then returns to step 1088. If the learner does want to choose the major learning area, the system returns to step 1072 and goes to the selected major learning area. Referring back to step 1088, if the learner does not have a proficiency rating, then the system randomly selects a major learning area as shown at step 1092. If the learner does have a proficiency rating, then the major learning area is selected according to the learner's proficiency rating as shown at step 1094.

Referring back to step 1080, if there is an active scenario and there is a choice of conversation modules for the scenario, the system then determines at step 1096 whether the learner has a proficiency rating. If the user does not have a proficiency rating then the system randomly selects a conversation module as shown at step 1098. If the learner does have a proficiency rating, then the conversation module is selected according to the learner's proficiency rating as shown at step 1100. Finally, if there is an active scenario and there is no choice of conversation modules for the scenario, the system goes to the selected conversation module as shown at step 1102.

Figure 30:
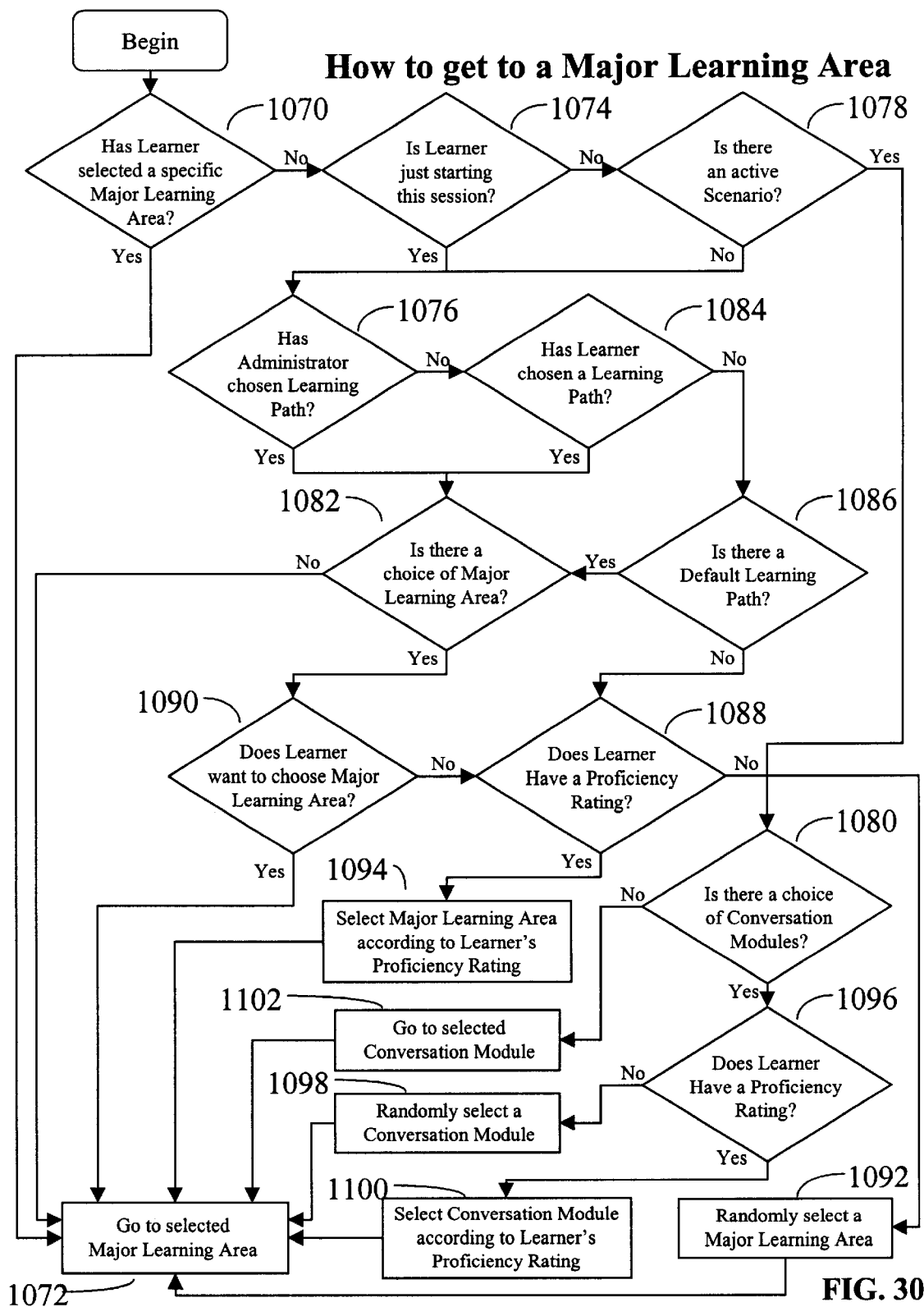
FIG. 30 is a flowchart of the process of navigation through the learning content to a major learning area implemented by the invention.
Figure 31:
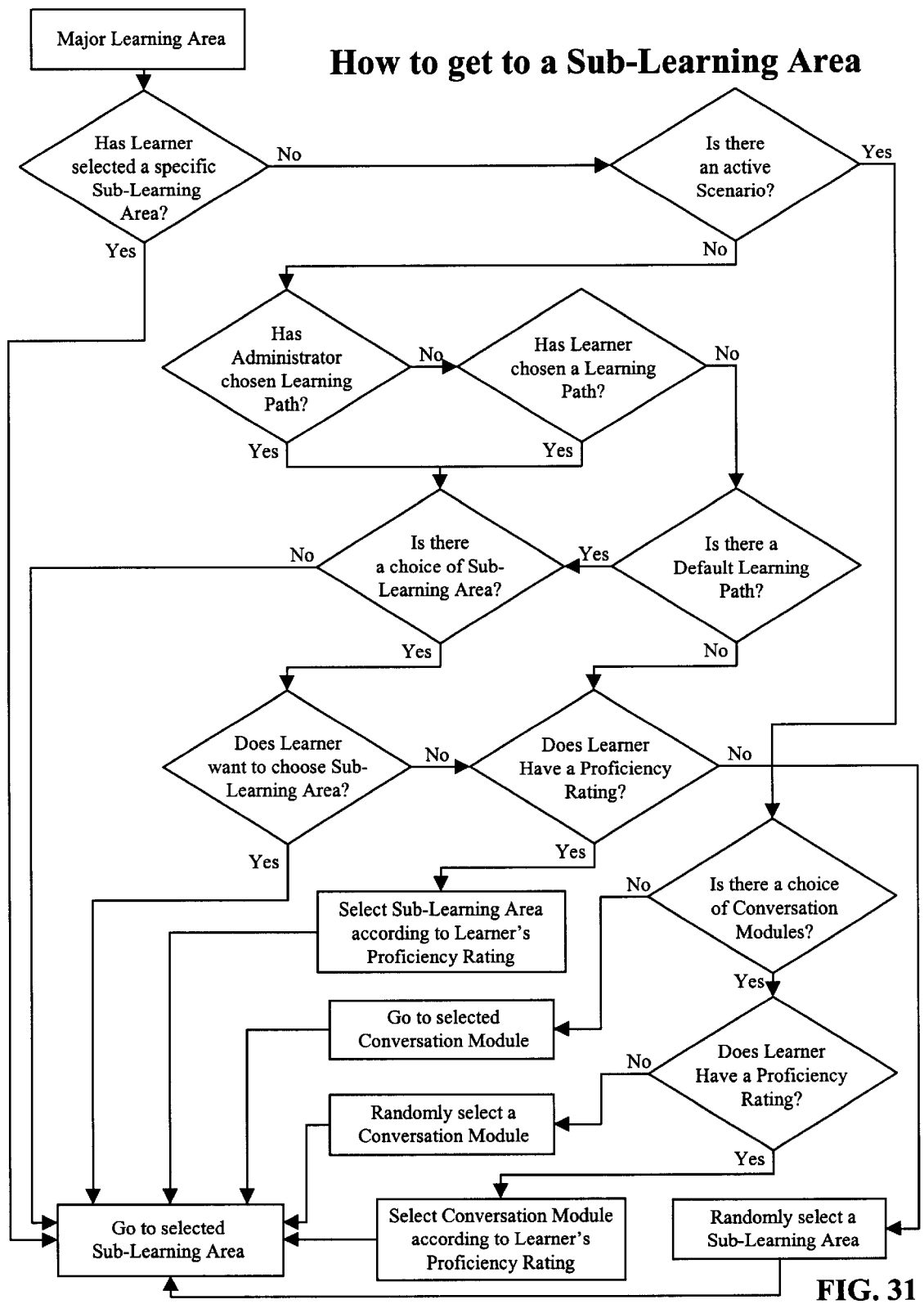
FIG. 31 is a flowchart of the process of navigating through the learning content to a sub-learning area implemented by the invention.
Figure 32:
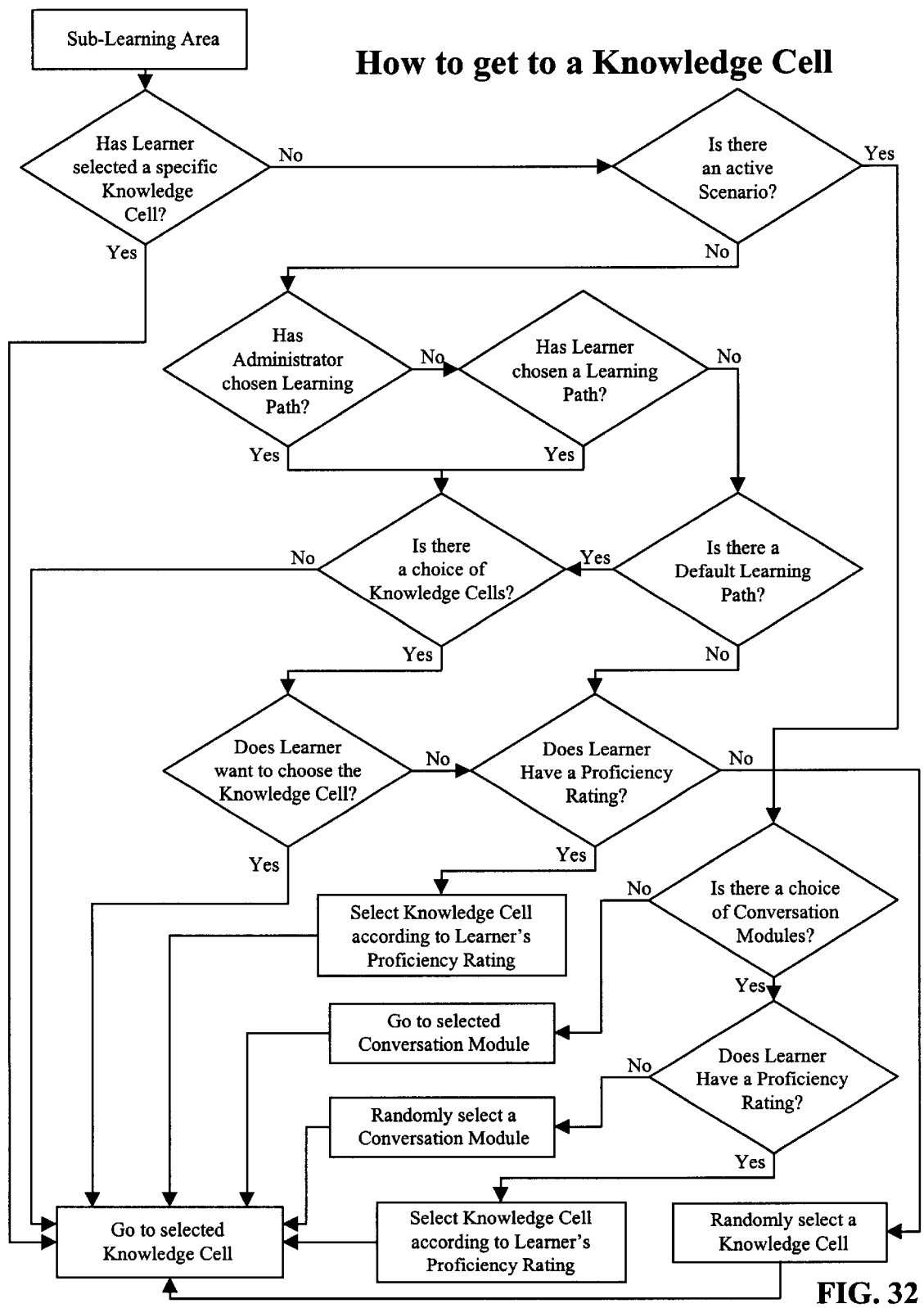
FIG. 32 is a flowchart of the process of navigating through the learning content to a knowledge cell implemented by the invention.

The process for selecting a sublearning area is similar to the process for selecting a major learning area. This process is shown in FIG. 31. Because the process is similar to the process shown in FIG. 30, it will not be discussed in detail herein. The process for selecting a knowledge cell is show in FIG. 32. Again, this process is similar to the process shown in FIG. 33. Accordingly, the process for getting to a knowledge cell will not be discussed in detail herein.

Figure 33:
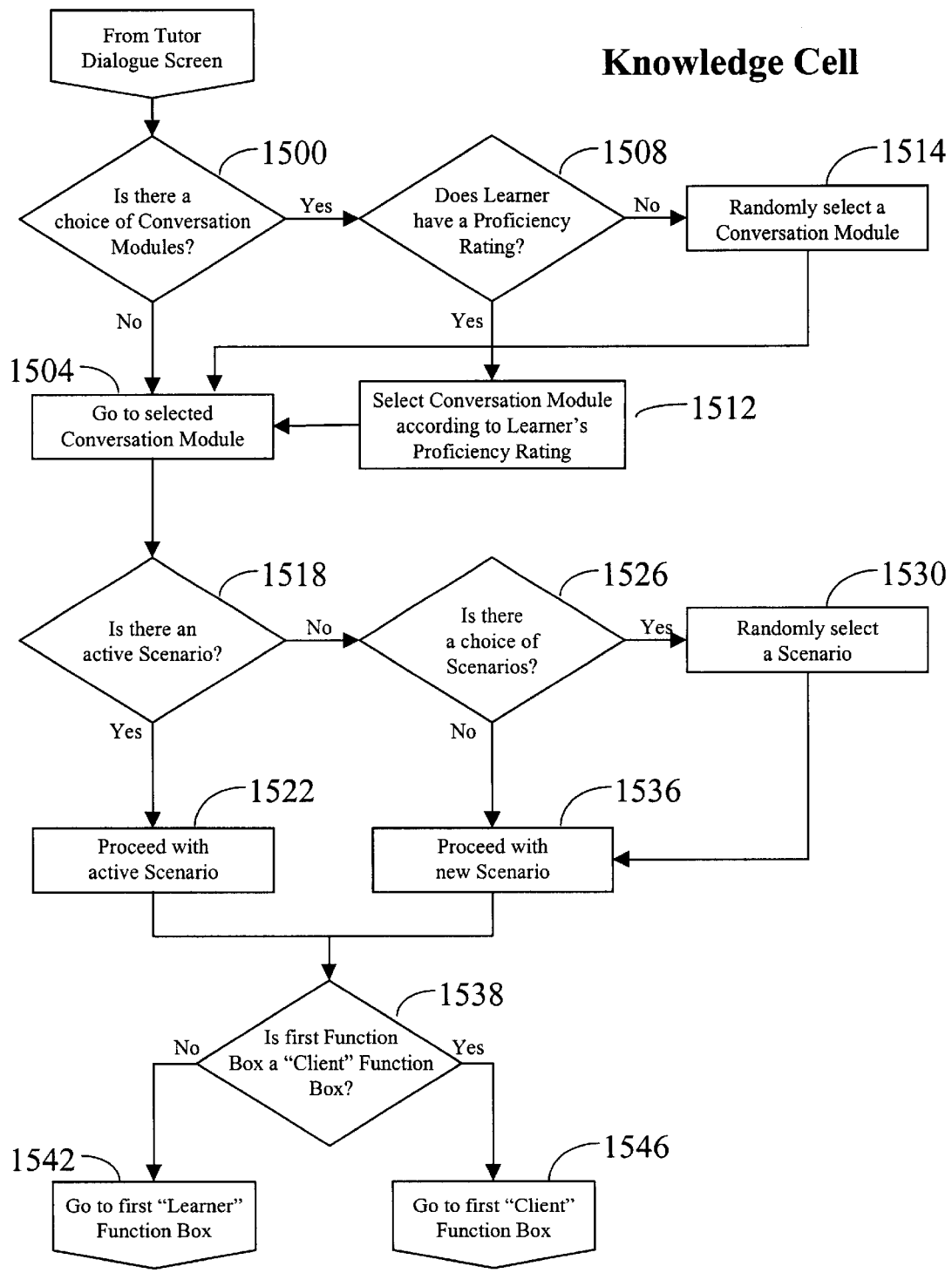
FIG. 33 is a flowchart of the process of selecting a conversation module implemented by the invention.

FIG. 33 shows the processes performed by the tutor dialogue screen 904. As shown at step 1500, the system first determines whether there is a choice of multiple conversation modules. If multiple choices are not available, then the system chooses the only available conversation module at step 1504. If there are multiple choices available then the proficiency rating for each module is determined at step 1508. If the learner has a proficiency rating than the conversation module to be used is chosen according to the user's proficiency at step 1512. Otherwise, a conversation module is chosen at random, as is shown at step 1514. At step 1518, the system determines whether there is an active scenario. If there is an active scenario, then the system proceeds with that scenario as is shown at step 1522. If not, the system determines whether multiple scenarios are available at step 1526. If multiple scenarios are available, then one is chosen at random, as is shown at step 1530. Even if multiple scenarios are not available, the system will proceed with a new scenario as is shown at step 1536. Once the scenario is determined, the system determines the status of the first active function box at step 1538. If the function box is a client function box the system proceeds to that box. Otherwise the system proceeds to the first learner function box, as is shown as steps 1542 and 1546.

Figure 34:
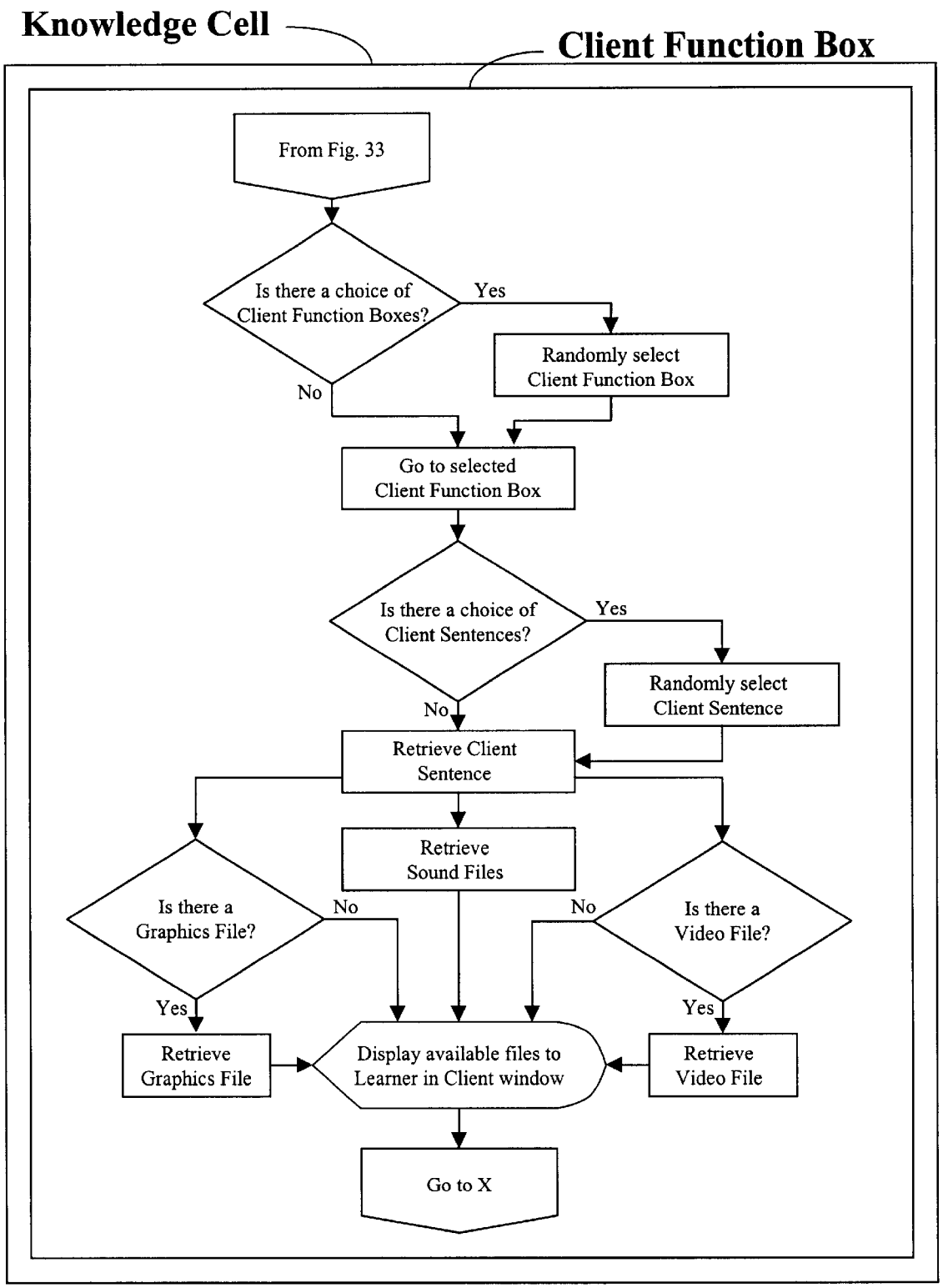
FIG. 34 is a flowchart of the process of selecting a client programmed conversation module implemented by the invention.
Figure 35:
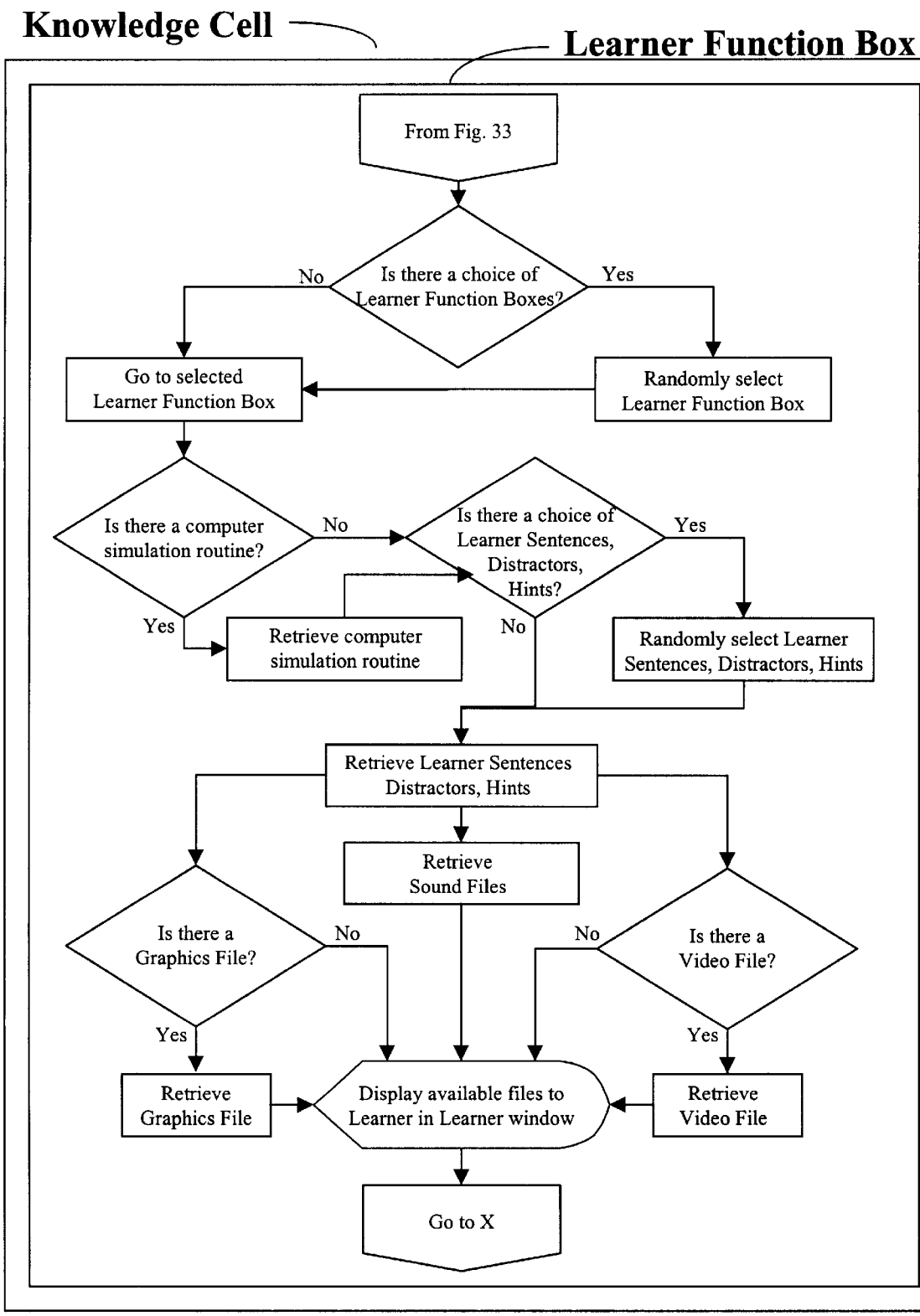
FIG. 35 is a flowchart of the process of selecting a learner programmed conversation module implemented by the invention.
Figure 36:
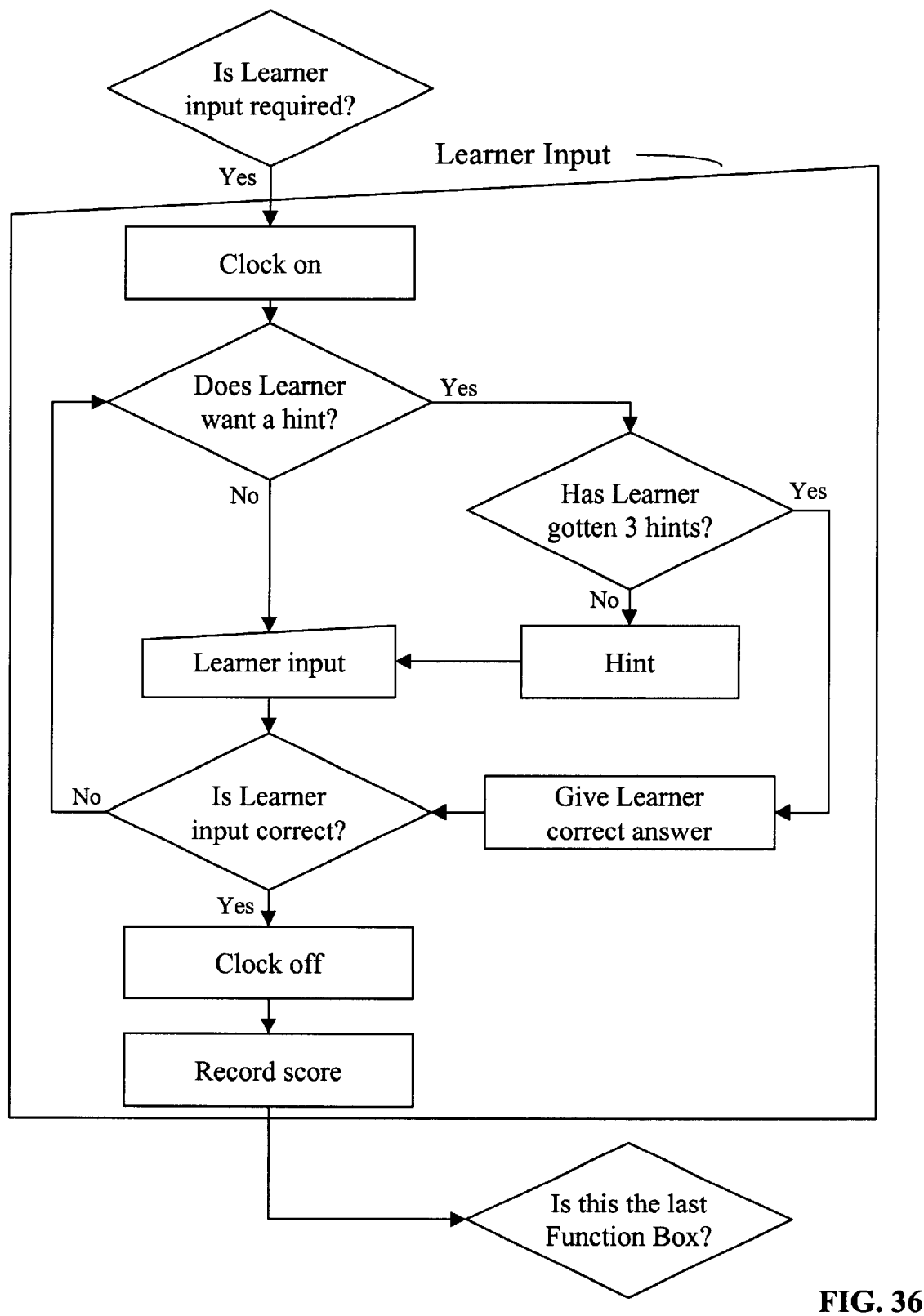
FIG. 36 is a flowchart of the process of reading user responses to proposed problems implemented by the invention.

As shown in FIGS. 34 and 35 the system then analyzes each function box, making determinations regarding the function boxes available, the sentences available, and the sound, graphic, and video files available. The system then compiles and links those files as necessary and presents the combined information to the user accordingly. Finally, as shown in FIG. 36, the user runs through the conversation and the system times the user, tracks the answers given, and tracks the hints used to calculate the user's score.

As can be seen from the above, the invention provides a method and system for creating interactive learning content. The invention also provides a method and system for training prospective job candidates.

Various features and advantages of the invention are set forth in the following claims.

What is claimed is:

1. A method of creating interactive learning content for a learner, the method comprising:
   providing a graphical authoring tool for adding content to a knowledge base and having a graphical mechanism to define functional roles of speakers;
   accepting content into the knowledge base through the graphical authoring tool;
   defining at least one learning unit based on the content in the knowledge base;
   defining a plurality of conversation paths for the at least one learning unit;
   defining at least one function box for each conversation path; and adding sentences to each function box of the conversation paths.

2. A method as claimed in claim 1, further comprising segmenting the interactive learning content into a public part and a private part.

3. A method as claimed in claim 1, further comprising establishing an authorization level to access the private part of the interactive learning content.

4. A method as claimed in claim 3, further comprising analyzing a user authorization to access the private part of the interactive learning content, and denying access to the private part of the interactive learning content if the authorization does not match the authorization level.

5. A method as in claim 1, further comprising recording, saving, and reproducing a plurality of sound files for at least some of the sentences within the interactive learning content.

6. A method as claimed in claim 5, further comprising maintaining a database of a plurality of actors that provide voices for the sound files, the database including contact information for the actors.

7. A method as claimed in claim 5, further comprising the step of providing a list of some of the plurality of sound files that need to be recorded.

8. A method as claimed in claim 1, further comprising creating a plurality of virtual players for the at least one learning unit.

9. A method as claimed in claim 8, further comprising assigning personality characteristics to at least one of the plurality of players with the graphical authoring tool.

10. A method as claimed in claim 1, further comprising proving a plurality of learning unit and categorizing the plurality of learning unit by at least one characteristic relating to a subset of the entire interactive learning content.

11. A method as claimed in claim 1, further comprising providing correct answers and distracter answers for each sentence.

12. A method as claimed in claim 1, further comprising providing a multiplier for the learning content.

13. A method as claimed in claim 12, further comprising adding manually entered information to the multiplier.

14. A method as claimed in claim 13, further comprising adding real-time information to the multiplier.

15. A method as claimed in claim 1, further comprising providing a sentence-editing tool.

16. A method as claimed in claim 15, further comprising providing a sentence inclusion tool to selectively include or remove sentences in and from the interactive learning content.

17. A method as claimed in claim 1, further comprising providing a plurality of learning unit and establishing a level of performance required-for a learner to achieve a proficiency rating in each of the plurality of learning unit.

18. A method as claimed in claimed in claim 1, further comprising determining a proficiency rating for a user based on at least one the following: a ratio based on correct to incorrect answers given; a number of hints given; and a length of time to respond.

19. A method as claimed in claim 18, further comprising determining a relative weight of the ratio of correct to incorrect answers given, the number of hints given, and the length of time to respond.

20. A method as claimed in claim 18, further comprising establishing a predetermined number of questions to be answered.

21. A method as claimed in claim 18, further comprising generating a visual depiction of whether the learner has reached the proficiency rating.

22. A method as claimed in claim 18, further comprising setting an initial proficiency rating.

23. A method as claimed in claim 18, further comprising providing a graphical representation of proficiency for each learner for each of the plurality of the learning unit.

24. A method as claimed in claim 1, further comprising the step of providing a graphical representation of proficiency for each class, client and content category for each and every of the plurality of the learning unit.

25. A method as claimed in claim 1, further comprising broadcasting to the learner at least one of the following: training classes which a client will pay for; a training class which is recommended; and a user-rating of a specific training class.

26. A method as claimed in claim 1, further comprising providing a means for a training administrator to view all of the plurality of sentences available in a function box of the learning unit.

27. A method as claimed in claim 8, further comprising providing a means for a training administrator to view any of the plurality of conversation path within a conversation module of the learning unit.

28. A method as claimed in claim 1, further comprising providing a means for the learner to choose an autopilot mode and a participation mode.

29. A method as claimed in claim 1, further comprising providing a means for the learner to specify a particular speed at which the learning content will be delivered.

30. A method as claimed in claim 18, further comprising the step of providing a means for the learner to compare the proficiency rating of the learner to a proficiency rating of other learners without revealing the specific identities of those other learners.

31. A method as claimed in claim 1, further comprising the step of leading the learner to specific courses based on a collaborative filtering capability that takes into account the individual learning style of the learner and relates that to learning styles and preferences of previous learners.

32. A method as claimed in claim 1, further comprising the step of providing a means for the learner to have the opportunity to re-answer questions answered incorrectly.

33. A method as claimed in claim 1, further comprising providing a bookmark tool to mark areas of the interactive learning content.

34. A method of creating an interactive learning content for a learner, the method comprising:

provide an interface for adding content to a knowledge base;

accepting content into the knowledge base through the interface;

defining at least one learning exercise based on the content in the knowledge base;

defining a plurality of conversation trees for the at least one learning exercise;

adding sentences to each of the conversation trees; and providing a means for the learner to choose one of a loop method and a standard method for receiving the interactive learning content, whereby the loop method keeps providing the learner with one of the plurality of the conversation trees from the conversation module and the standard method provides the learner with one of the plurality of the conversation trees from a sequentially related conversation module.

35. A method of creating an interactive learning content for a learner, the method comprising:

providing an interface for adding content to a knowledge base;

accepting content into the knowledge base through the interface;

defining at least one learning exercise based on the content in the knowledge base;

defining a plurality of conversation trees for the at least one learning exercise;

adding sentences to each of the conversation trees; and providing a means for the learner to interactively suggest new sentences for any function box of any learning unit.

36. A method of creating an interactive learning content for a learner, the method comprising:

providing an interface for adding content to a knowledge base;

accepting content into the knowledge base through the interface;

defining at least one learning exercise based on the content in the knowledge base;

defining a plurality of conversation trees for the at least one learning exercise;

adding sentences to each of the conversation trees; and providing a means for the learner to interactively suggest new paths for any conversation tree within a conversation module of any learning unit.

* * * * *

UNITED STATES PATENT AND TRADEMARK OFFICE
CERTIFICATE OF CORRECTION

PATENT NO. : 6,527,556 B1  Page 1 of 1
DATED : March 4, 2003
INVENTOR(S) : Robin S. Koskinen It is certified that error appears in the above-identified patent and that said Letters Patent is hereby corrected as shown below:

Column 5,
Line 5, after "system" and before "provided" insert -- 10 --.

Column 12,
Lines 15-19, starting on line 15 delete "even greater variation may be created such that multiple conversation modules exist within a single knowledge cell. As shown in Fig. 16, a knowledge cell 400 includes conversation modules 402 and 404."

Column 15,
Line 62, delete "unit" and insert therefor -- units --.

Column 16,
Lines 14, 16, 36, 40, and 63, delete "unit" and insert therefor -- units --.
Line 37, delete "1" and insert therefor -- 18 --.
Line 50, delete "8" and insert therefor -- 1 --.
Line 52, delete "path" and insert therefor -- paths --.

Signed and Sealed this

Fifth Day of August, 2003

JAMES E. ROGAN
*Director of the United States Patent and Trademark Office*